March 26, 1929.  G. A. BOUVIER ET AL  1,706,727
STRAND ASSEMBLING APPARATUS
Filed Feb. 5, 1926  12 Sheets-Sheet 2

Inventors
George A. Bouvier
John W. Richter
by H. A. Vatuson Att'y.

Inventors
George A. Bouvier
John. W. Richter
by Matthews Att'y.

March 26, 1929.  G. A. BOUVIER ET AL  1,706,727
STRAND ASSEMBLING APPARATUS
Filed Feb. 5, 1926   12 Sheets-Sheet 4
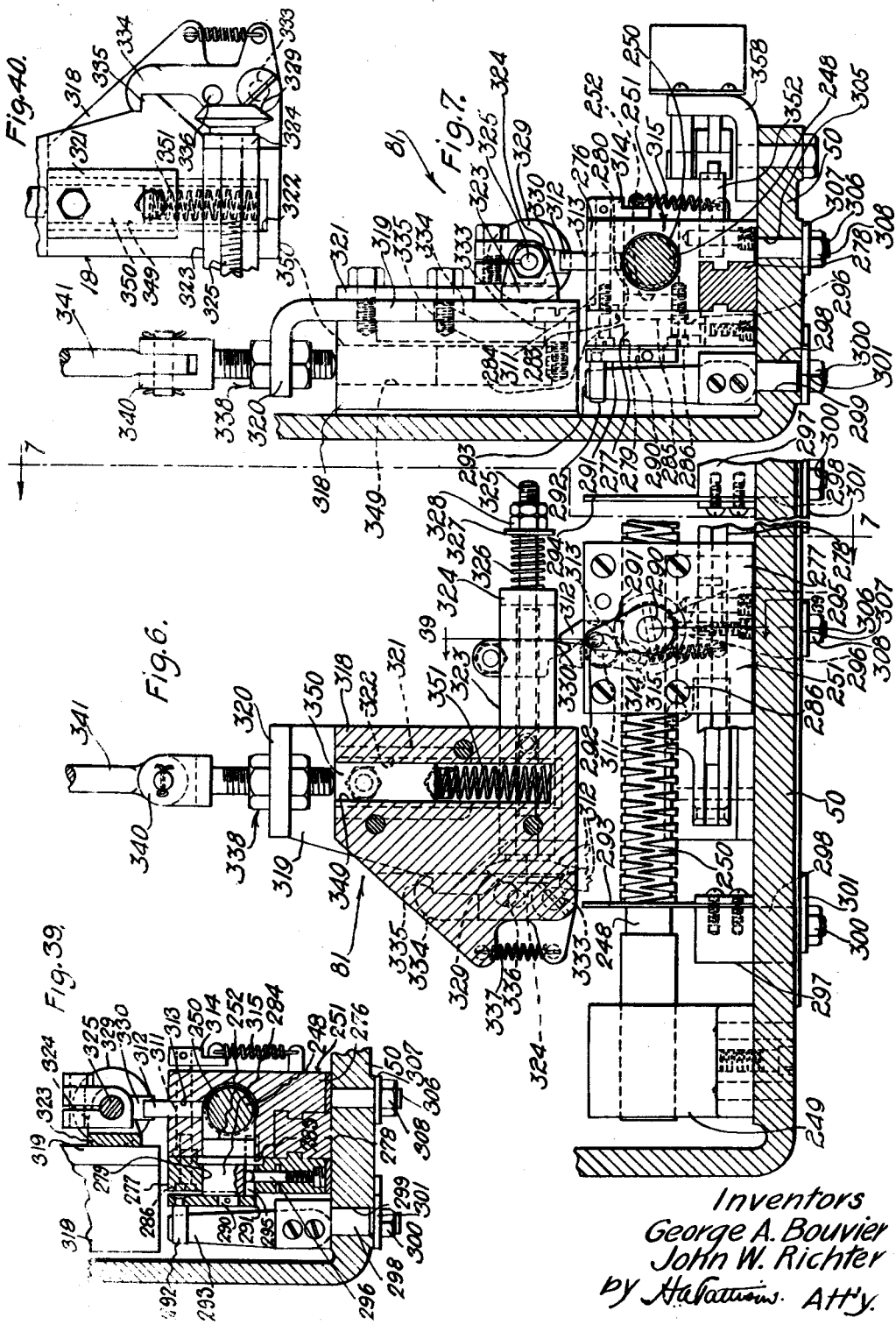
Inventors
George A. Bouvier
John W. Richter
by H. A. Matthews Att'y.

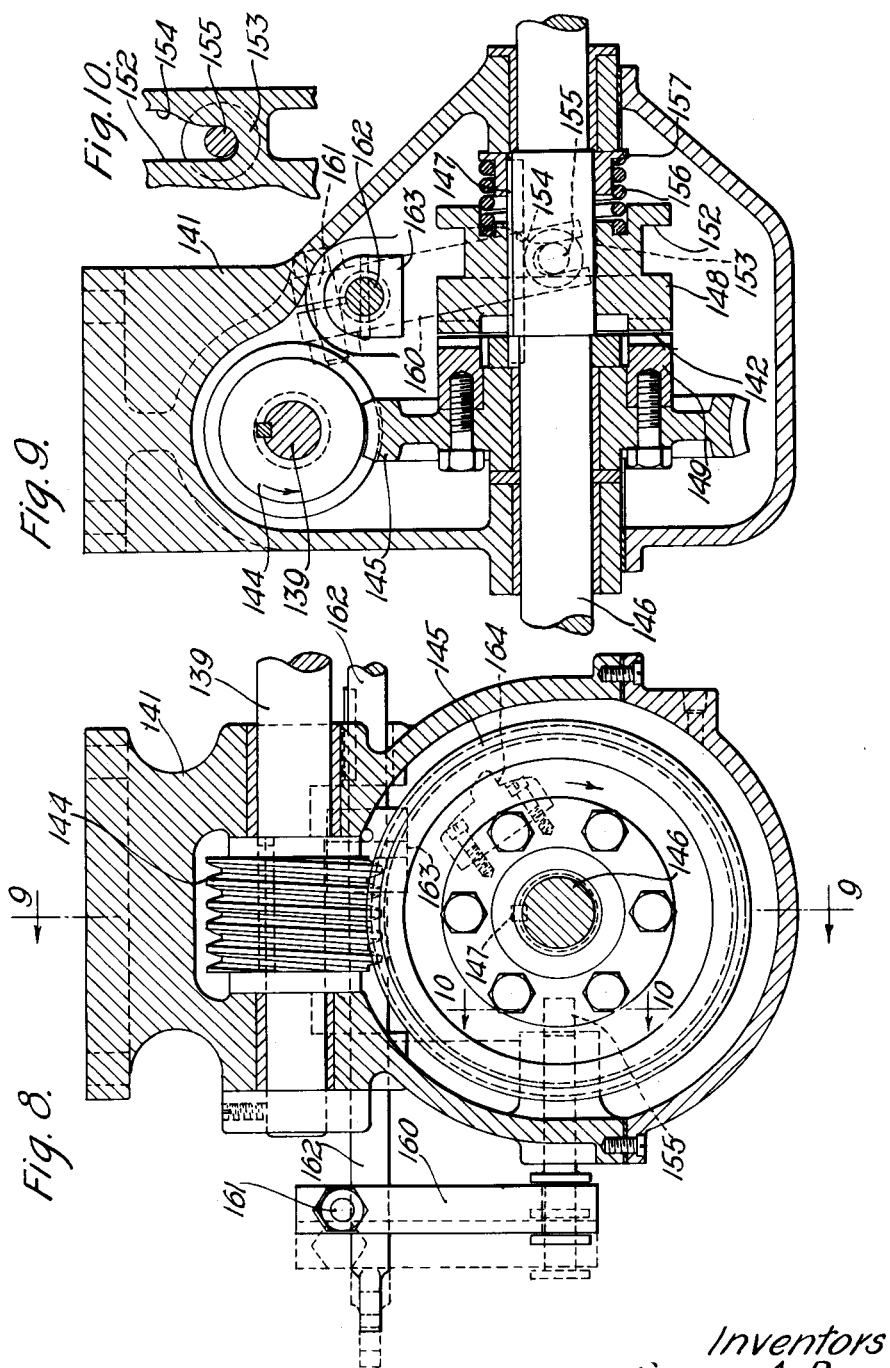

March 26, 1929.    G. A. BOUVIER ET AL    1,706,727
STRAND ASSEMBLING APPARATUS
Filed Feb. 5, 1926    12 Sheets-Sheet 6

Inventors
George A. Bouvier
John. W. Richter
by H. A. Tatum Att'y.

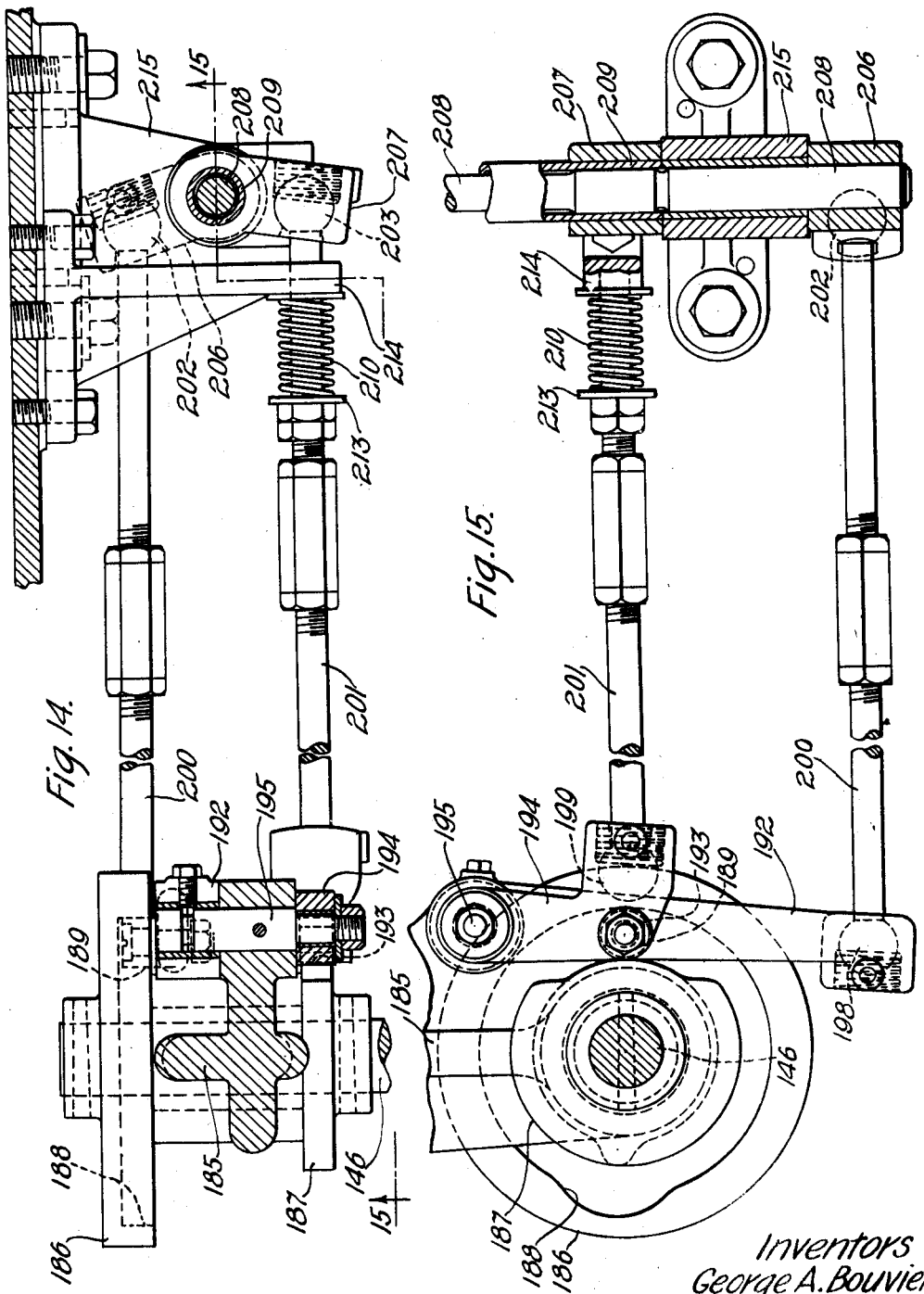

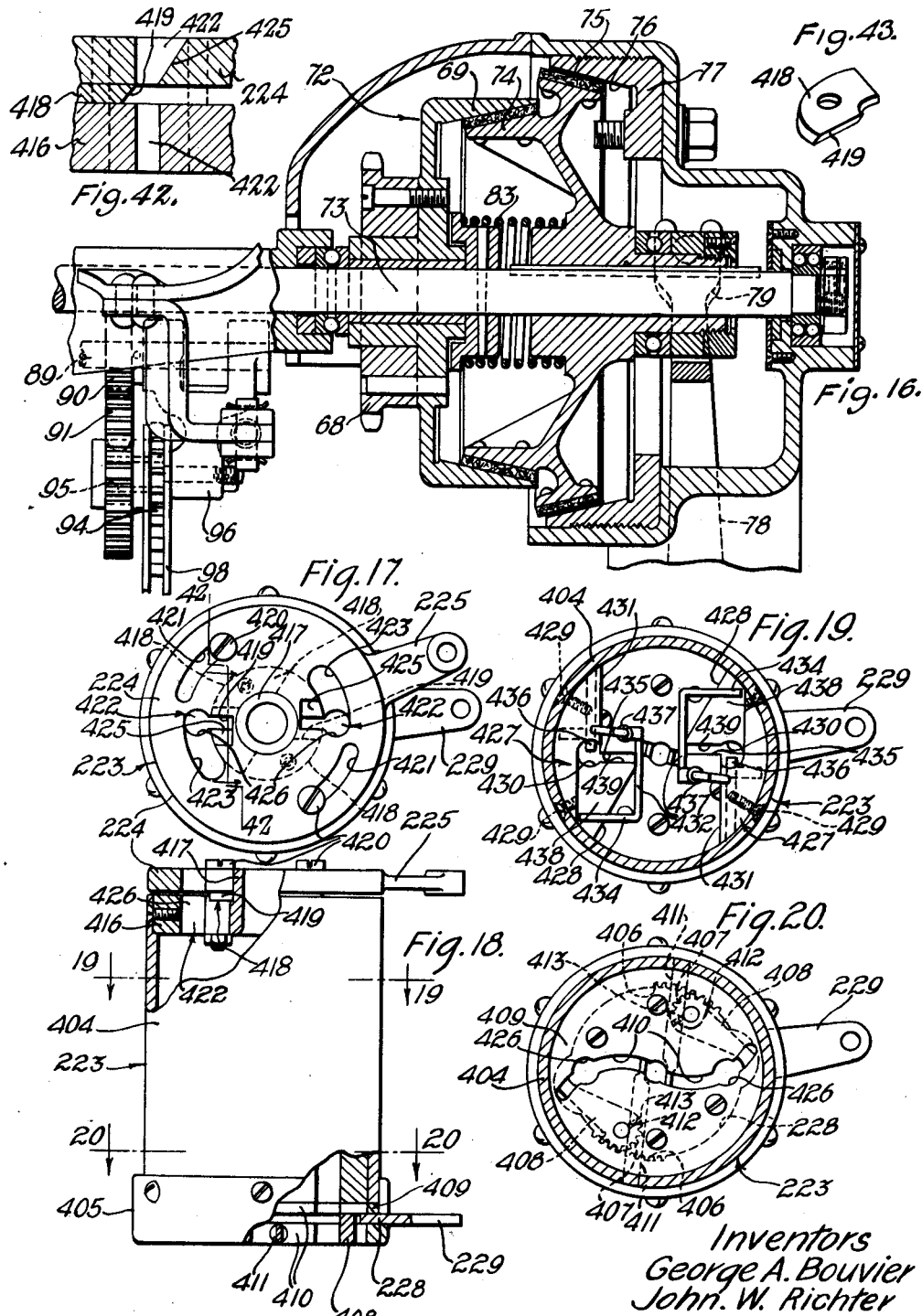

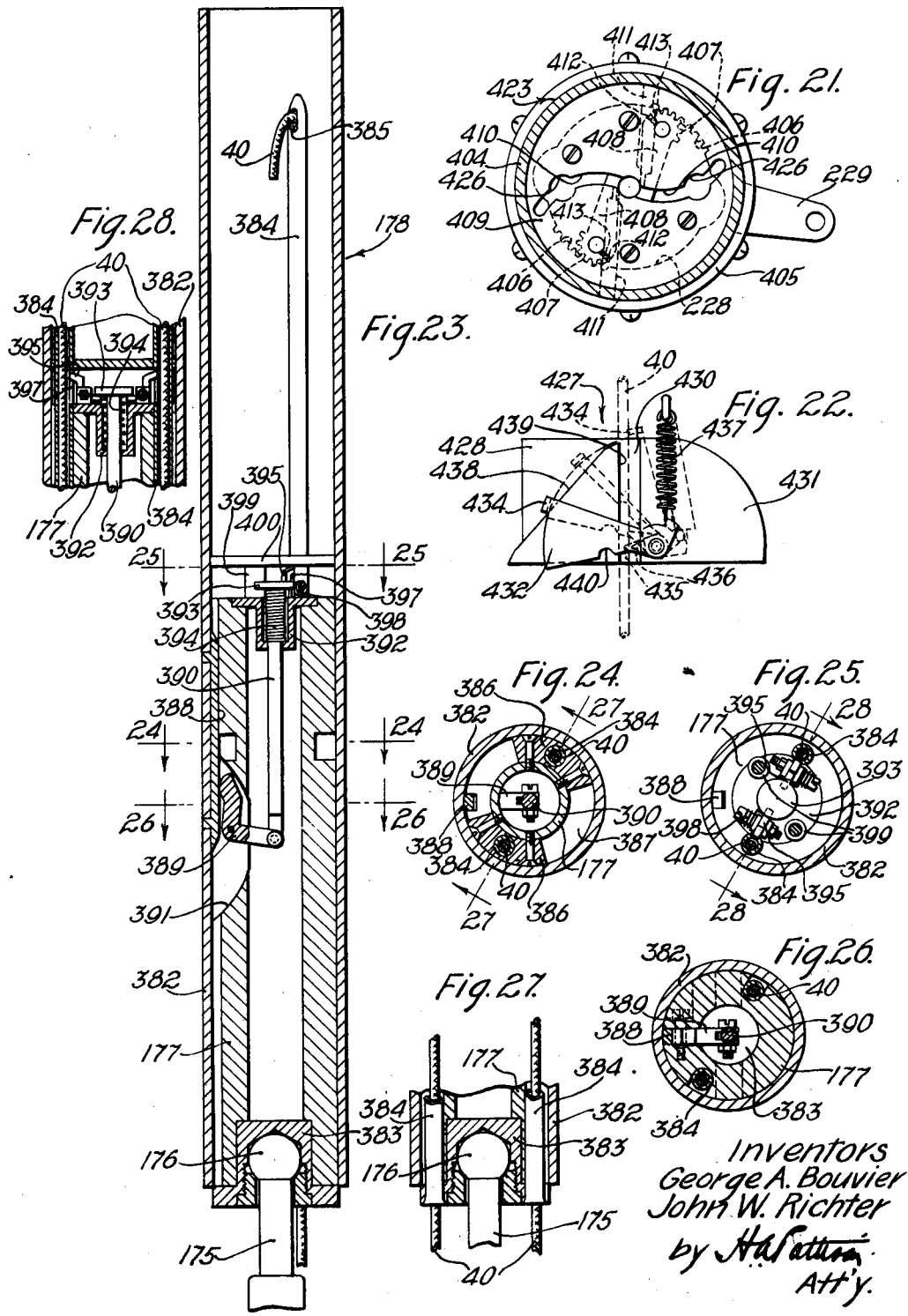

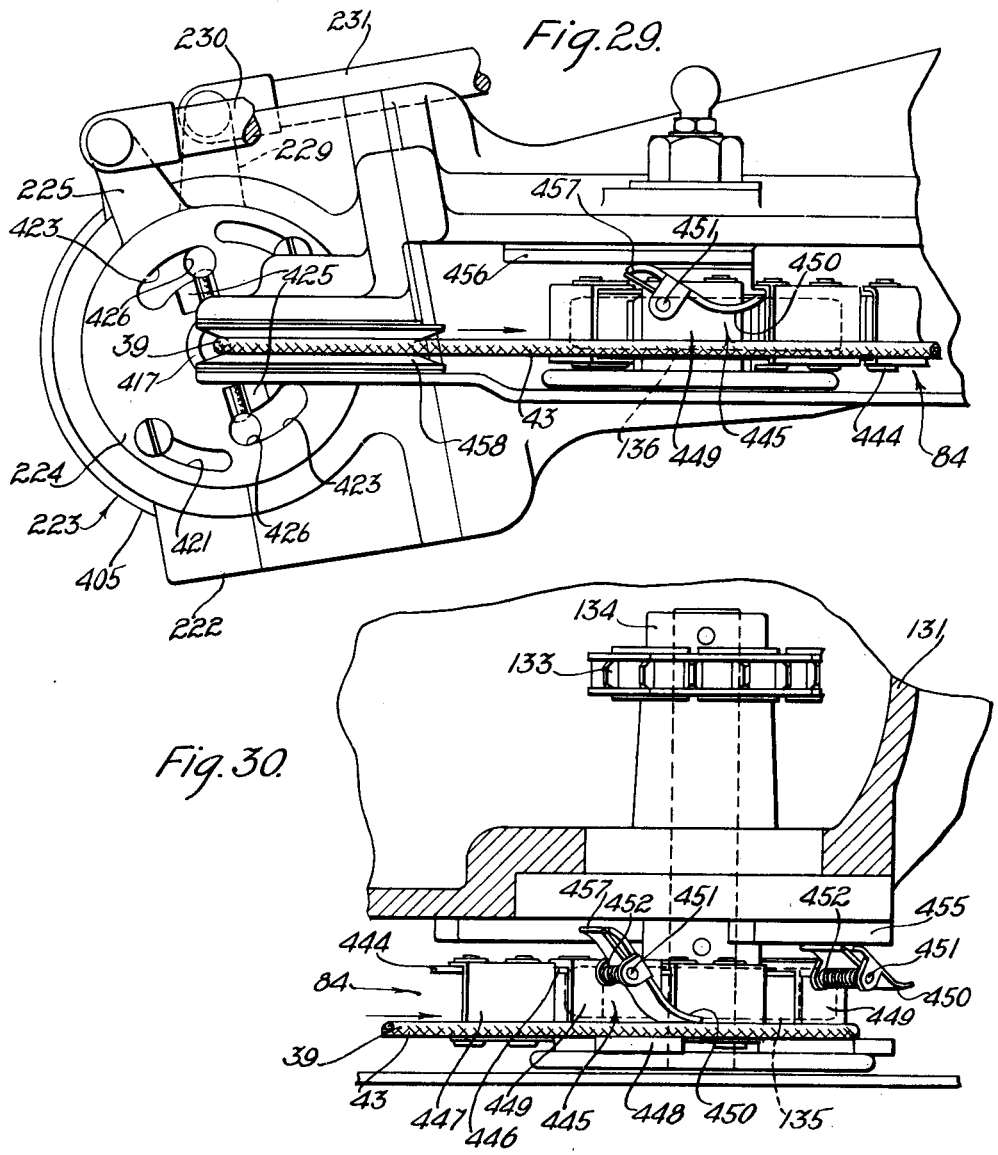

March 26, 1929.  G. A. BOUVIER ET AL  1,706,727
STRAND ASSEMBLING APPARATUS
Filed Feb. 5, 1926  12 Sheets-Sheet 11
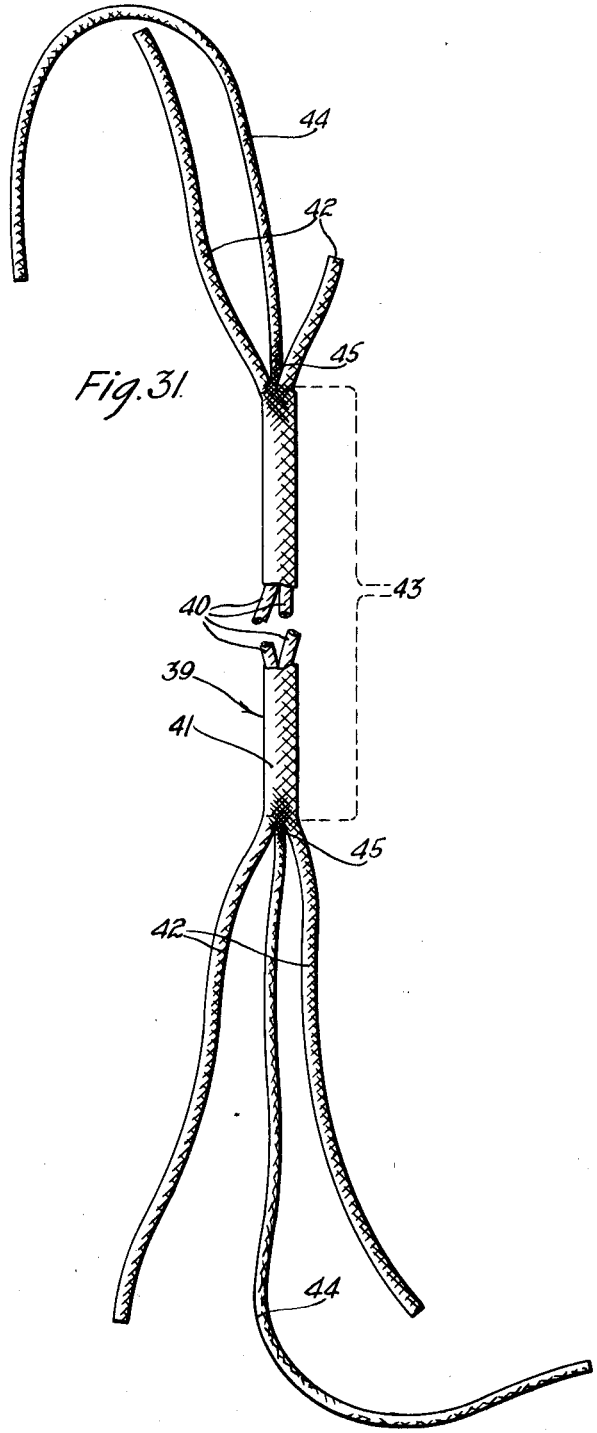
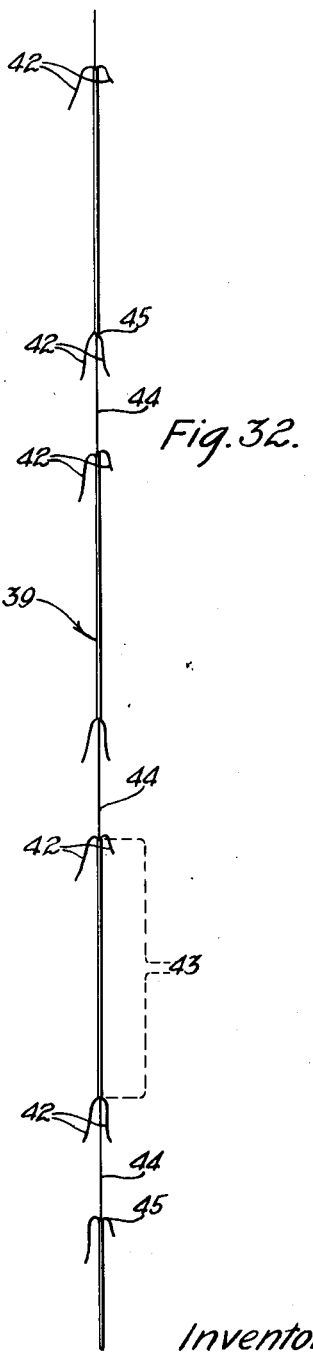
Inventors
George A. Bouvier
John W. Richter
by their Atty.

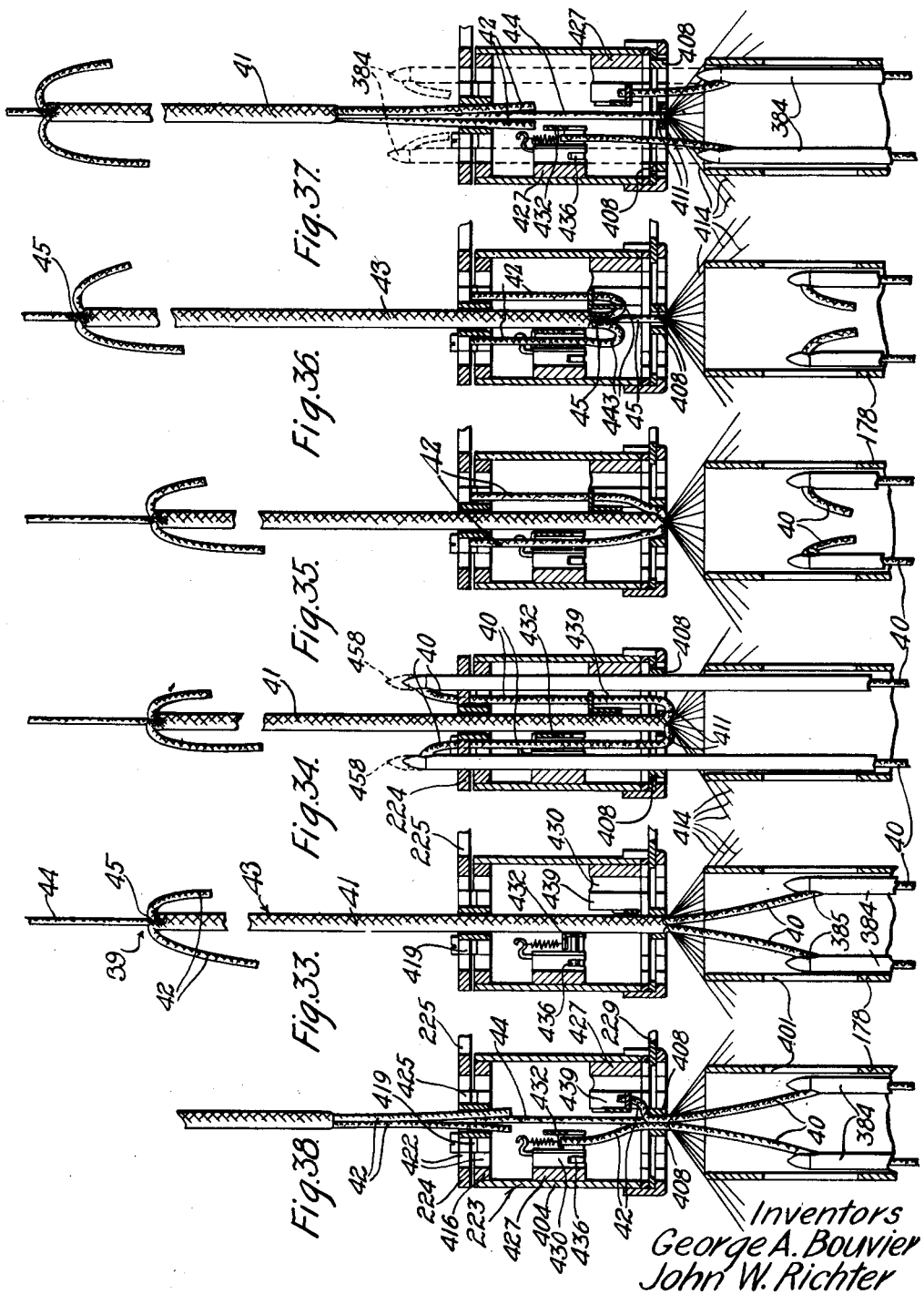

Patented Mar. 26, 1929.

1,706,727

UNITED STATES PATENT OFFICE.

GEORGE ALFRED BOUVIER, OF OAK PARK, AND JOHN WILLIAM RICHTER, OF CHICAGO, ILLINOIS, ASSIGNORS TO WESTERN ELECTRIC COMPANY, INCORPORATED, OF NEW YORK, N. Y., A CORPORATION OF NEW YORK.

STRAND-ASSEMBLING APPARATUS.

Application filed February 5, 1926. Serial No. 86,109.

This invention relates to strand assembling apparatus, and more particularly to apparatus for automatically producing complete units or assemblies of electrical conductors.

It is sometimes desirable, especially in telephone systems, to employ a plurality of individually insulated flexible electrical conductors assembled into a unit ordinarily termed a "cord" for electrically interconnecting co-operating devices of the system. For convenience in handling these assembled units in service as well as to reduce wear upon the insulation of the individual conductor, they are frequently sheathed throughout the greater portion of their length with a common textile covering braided thereover. In such instances the individual conductors project suitable lengths from each end of the sheath to permit their connection with the terminals of the associated devices.

The primary object of this invention is to provide an improved apparatus of the aforementioned type of producing assemblies of strands uniformly, rapidly, efficiently, without any appreciable waste of material, and with a minimum of manual labor.

In accordance with one embodiment of this invention there is provided in connection with a braiding machine means for producing, in continuous succession from continuous lengths of individually insulated electrical conductors, multiple conductor cords of predetermined length covered with braided textile sheaths terminating in suitable mechanical attaching portions and from which the individual conductors extend predetermined distances. Positively driven and timed means accurately control the operation of the braiding head to produce the sheath and attaching portions, as well as the rapid and uniform formation and severance of the projecting terminating portions of the individual conductors.

Other objects and advantages of this invention will more fully appear from the accompanying detailed description taken in connection with the accompanying drawings which illustrate one embodiment thereof, in which Fig. 1 is a fragmentary side elevation of an intermittent cord braiding machine embodying the features of this invention;

Fig. 6 is an enlarged fragmentary detail plan view, partly in section, of the timing and tripping mechanism on the line 6—6 of Fig. 2 looking in the direction indicated by the arrows;

Fig. 7 is a sectional view on the line 7—7 of Fig. 6 looking in the direction indicated by the arrows;

Fig. 8 is an enlarged vertical sectional view through the elevator drive clutch on the line 8—8 of Fig. 1 looking in the direction indicated by the arrows;

Fig. 9 is a sectional view on the lines 9—9 of Figs. 2 and 8 looking in the direction indicated by the arrows, it being enlarged with respect to Fig. 2;

Fig. 10 is a fragmentary sectional view on the line 10—10 of Fig. 8 looking in the direction indicated by the arrows;

Fig. 14 is an enlarged detail plan view, partly in section, of the cutting and gathering cams on the line 14—14 of Fig. 1 looking in the direction indicated by the arrows;

Fig. 15 is a sectional view on the lines 15—15 of Figs. 1 and 14 looking in the direction indicated by the arrows, it being enlarged with respect to Fig. 1;

Fig. 16 is an enlarged vertical sectional view through the braiding head clutch on the line 16—16 of Fig. 3 looking in the direction indicated by the arrows;

Fig. 17 is an enlarged plan view of the cord gathering and cutting mechanism;

Fig. 18 is a side view thereof, partly in section;

Figs. 19 and 20 are sectional views on the lines 19—19 and 20—20 respectively thereof looking in the direction indicated by the arrows;

Fig. 21 is a sectional view similar to Fig. 20 only with the parts shown in another position;

Fig. 22 is a detail view of a cord clamp associated with the cord gathering and cutting mechanism;

Fig. 23 is an enlarged vertical sectional view through the cord feeding and elevating mechanism;

Figs. 24, 25 and 26 are sectional views on the lines 24—24, 25—25 and 26—26 respectively thereof looking in the direction indicated by the arrows;

Fig. 27 is a vertical sectional view of the lower portion of Fig. 23 taken on the line 27—27 of Fig. 24 looking in the direction indicated by the arrows;

Fig. 28 is a vertical sectional view taken on the line 28—28 of Fig. 25 looking in the direction indicated by the arrows;

Figs. 29 and 30 are enlarged fragmentary plan views of opposite ends of the conveyor belt;

Fig. 31 is a fragmentary elevation of a telephone cord having the terminal portions of two conductors freed from the braid enclosing their main portion, and such braid continued independently of the free core terminal to form a tie cord of greater length than said core terminals;

Fig. 32 is a view of a string of telephone cords as produced by a mechanism embodying the features of this invention and before being cut to form separate cords as indicated in Fig. 31;

Figs. 33 to 38 inclusive are vertical sectional views through the cord feeding and elevating and cutting and gathering mechanisms, showing successive steps thereof in the process of producing a string of connected telephone cords.

Figure 1:
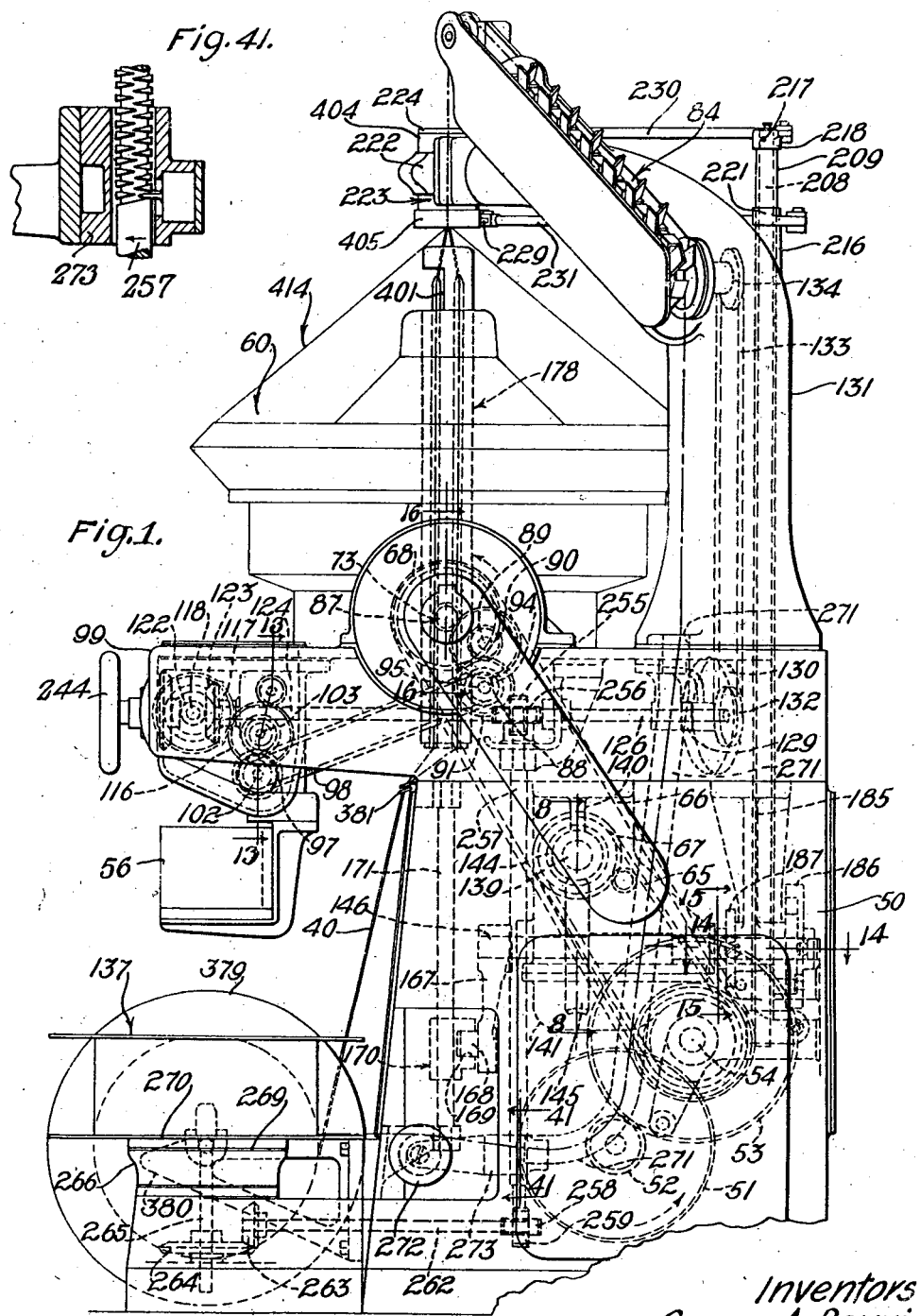

Fig. 39 is a sectional view on the line 39—39 of Fig. 6 looking in the direction indicated by the arrows;

Fig. 40 is a fragmentary view of Fig. 7 looking toward the left thereof;

Fig. 41 is an enlarged vertical sectional view on the line 41—41 of Fig. 1 looking in the direction indicated by the arrows showing the mechanism for distributing the completed cords upon the take-up reel;

Fig. 42 is a sectional view on the line 42—42 of Fig. 17 looking in the direction indicated by the arrows showing in detail the cord cutting mechanism, and Fig. 43 is a perspective view of one of the stationary knife blades of the cord cutting mechanism.

In the drawings (Figs. 31 and 32) is illustrated one article which may be advantageously produced by the apparatus forming the subject matter of this invention, namely, a telephone cord. In Fig. 32 is illustrated a plurality of connected cords 39 as delivered from the machine, and Fig. 31 shows an enlarged fragmentary view of one of the units after separation from the string of cords illustrated in Fig. 32. Each telephone cord, as herein illustrated, comprises a pair of individually insulated conductors 40 (Fig. 31) with a sheath 41 braided thereon along their entire length, except at their ends, which extend outside of the sheath and form terminal portions 42 for the cord. In the particular type of cord produced by the machine to be presently described, the terminals 42 at one end of the cord are of equal length while at the opposite end they are unequal in length. The sheathed portion of the cord forms what will hereinafter be termed the body portion and is indicated generally by the numeral 43. The sheathing 41 at each end of the body portion is continued without enclosing the conductors 40 as indicated by the numeral 44, to form what is termed a stay cord, which serves as a means for mechanically securing the cord to prevent strain upon the terminals 42 when the telephone cord is in use. In the forming of the string of cords illustrated in Fig. 32, the interconnected stay cords 44 cooperate with a completed unit for drawing through the machine the next unit which is being formed.

It is desirable that a portion of the stay cord 44 adjacent the point where the sheathing 41 of the body portion 43 ends, and the stay cords begin or vice-versa to provide a tighter or closer braiding for the purpose of adding strength and to improve the appearance at these points of the braiding as indicated by the numeral 45 (Fig. 31), the balance of the stay cord being braided loose or coarse compared to the braiding enclosing the body portion 43. This is preferably effected by varying the drawing speed of the string of cords during the braiding operations along with the speed of the take-up reel, the speed of the braiding head remaining constant.

*Drive to braiding head and conveyor belt.*

Figure 2:
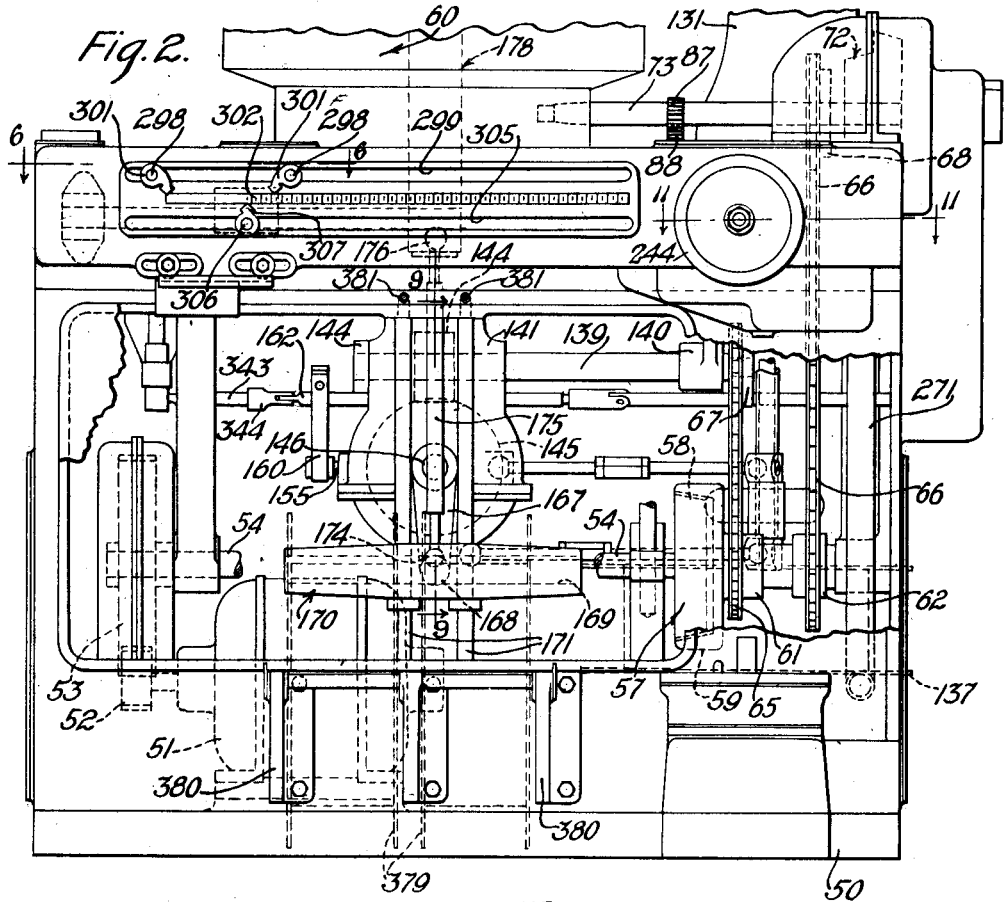
Fig. 2 is a fragmentary elevation of the lower portion thereof.

Referring to the drawings, wherein like reference numerals designate like parts throughout the drawings, 50 indicates a suitable base or frame upon which the entire apparatus is mounted including a driving motor 51 (Fig. 2), which in operation is connected to a suitable source of electrical current. The motor shaft has affixed thereto a pinion 52 which meshes with a gear 53 secured to a main drive shaft 54 (Figs. 1 and 2). The shaft 54 which is split, as will be readily understood, carries a suitable main drive clutch 57 of any well known cone-face friction type, comprising a driving member 58 rotatable with but reciprocably carried upon the section of the shaft 54 carrying the gear 53 and a driven member 59 keyed to rotate with the other section of the shaft 54. The clutch member 58 is adapted to be shifted by operating a suitable lever mechanism (not shown) whereby an operator may engage or disengage the clutch to set in motion or stop a braiding head of ordinary type indicated in diagrammatic outline at 60 (Figs. 1, 2 and 3) and the various mechanisms associated therewith and to be described in detail hereinafter. A container 56 for holding a supply of cotton cops for the braiding head 60 is carried in a convenient position upon the front of the machine. Affixed to the section of the shaft 54 carrying the driven clutch member 59 are a pair of sprocket wheels 61 and 62 connected by sprocket chains 65 and 66 to sprocket wheels 67 and 68 respectively. The sprocket wheel 68 (Fig. 16) is secured to a driving member 69 of a cone-face friction type clutch 72 by which the braiding head 60 may be set in motion or brought to a halt without interfering with the operation of the hereinbefore mentioned associated mechanisms. The member 69 is freely rotatable upon a rotatable shaft 73 adapted upon being rotated to cause the operation of the braiding head 60. A driven member 74 of the clutch is reciprocably carried upon the shaft 73 but rotatable therewith and in the position of this member as indicated in Fig. 16, the clutch is engaged and the braiding head will be caused to operate through the rotation of the shaft 73. It is desirable upon the disengagement of the clutch 72 that the braiding head 60 be brought to a quick standstill, so that the operation of the heretofore mentioned associated mechanisms for subsequent operations upon the cord 39 will not be delayed. To accomplish this the driven clutch member 74 is equipped with a cone-face friction surface 75 which upon the clutch being disengaged it will readily be apparent immediately contacts with a similar face 76 provided upon a stationary housing 77 for the clutch and thereby instantaneously checks the rotation of the braiding head and drive shaft 73.

The driven clutch member 74 is adapted to be moved upon the shaft 73 to engage or disengage the driving member 69 by the movement of a shifting fork 78, a forked end 79 of which is operatively engaged in a well known manner with the member 74 (Fig. 16). The fork 78 is pivoted intermediate its ends as indicated at 80 (Fig. 3) and is operated automatically at predetermined intervals through a timing and tripping mechanism 81 (Figs. 3 to 7, inclusive, 39 and 40) to be described hereinafter. A coiled compression spring 83 is mounted around the shaft 73 between the clutch members 69 and 74 for instantaneously disengaging the clutch 72 and engaging the braking surfaces 75 and 76, as hereinbefore described.

The completed connected cords 39 are pulled through the machine by an endless link conveyor belt 84 (Figs. 1, 3, 29 and 30), which will be referred to in greater detail hereinafter. For the present the means for driving the conveyor belt 84 will be described. As hereinbefore mentioned, it is desirable that a portion of the stay cord 44 of the telephone cord be braided coarse or loose compared to the portion thereof adjacent its point of connection with the braiding upon the body portion 43 of the cord, at which latter points strength and appearance is desired. This is accomplished by drawing the stay cord during the braiding thereof at a relatively greater speed than that provided during the braiding of the body portion, which results in a saving of thread and greater output in a given time, as will readily be apparent. To provide for this, the drawing speed of the conveyor belt 84 is automatically changed in proper sequence by the following mechanism. Referring particularly to Figs. 1, 2, 3 and 16, the braider drive shaft 73 has affixed thereto a pinion 87 meshing with a gear 88 secured to a jack shaft 89 also having secured thereto a gear 90 in turn meshing with a gear 91 integral with a sprocket wheel 94. The gear 91 and wheel 94 being rotatably mounted upon a shaft 95 supported upon a bracket 96 (Fig. 16), the latter also supporting the jack shaft 89. The motion of the sprocket 94 is transmitted to a sprocket wheel 97 through a chain 98. A gear box for the timing and tripping mechanism 81 is indicated at 99 within which is journaled a shaft 102 (Figs. 12 and 13) upon which is secured the sprocket wheel 97.

Figure 13:
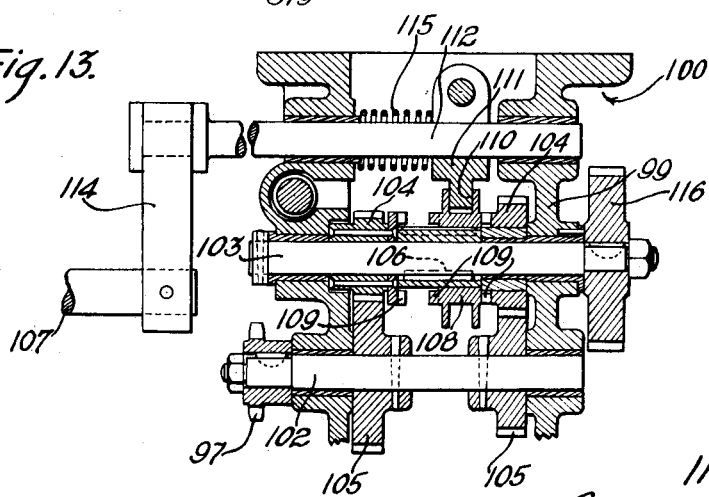
Fig. 13 is a vertical sectional view on the lines 13—13 of Figs. 1 and 11 looking in the direction indicated by the arrows, it being enlarged with respect to Fig. 1.

Referring to Fig. 13 which illustrates a vertical sectional view through a change speed mechanism 100 of the drive for the conveyor belt 84, 103 is a rotatable shaft carrying a pair of freely rotatable change speed gears 104 which mesh with a second pair of gears 105 secured to the shaft 102. Reciprocably carried upon the shaft 103, but secured to rotate therewith through a key indicated at 106 and positioned intermediate the gears 104, is a jaw clutch member 108 provided upon opposite end faces with clutch teeth 109 adapted to engage with similar teeth provided upon adjacent end faces of the gears 104. A circular channel 110 is provided in the periphery of the member 108, within which is entered a shifting yoke 111 clamped upon a rod 112 which is automatically shifted toward the left (Fig. 13) in proper sequence during the operation of the mechanism by a magnetic solenoid 113 (Fig. 3) included in the timing and tripping mechanism 81. The rod 112 and a core 107 (Figs. 11, 12 and 13, inclusive) of the solenoid 113 are operatively connected together by suitable means indicated by the numeral 114. It will readily be apparent that upon imparting rotation to the shaft 102 that the shaft 103 will be rotated either relatively fast or slow depending upon whether the member 108 is clutched to the left or right hand gear 104 as viewed in Fig. 13, the unclutched gear 104 running idle upon the shaft 103.

Figure 3:
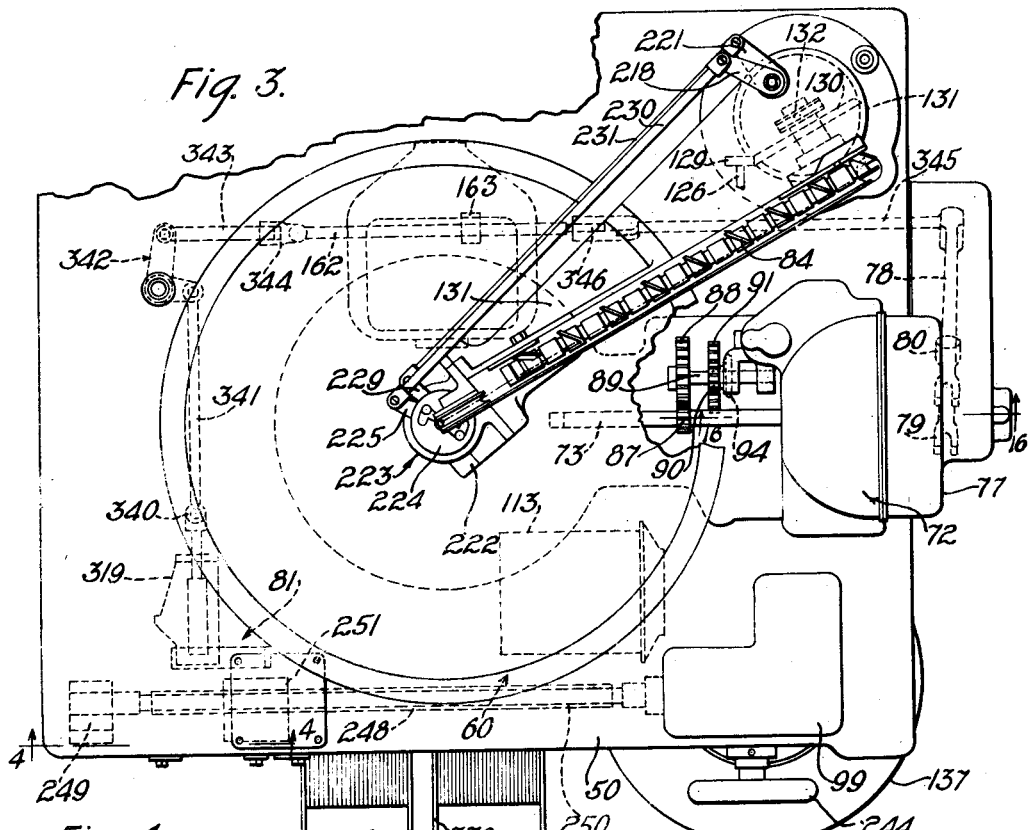
Fig. 3 is a fragmentary plan view thereof.

In Fig. 13, the member 108 is shown as clutched to the right hand or slow speed gear 104 which indicates that the body portion of the telephone cord is being braided, the drive being from the right hand gear 105 to the right hand or high speed gear 104 to the member 108, which being keyed to the shaft 103 causes the rotation thereof. It will be clear that when the drive is from the left hand gear 105 to the left hand gear 104 to the member 108, that the shaft 103 will be rotated at a faster speed due to the greater diameter of the left hand gear 105 compared to the left hand gear 104. A compression spring 115 is positioned upon the rod 112 between the fork 111 and a wall of the box 99 for the purpose of restoring the core 107 of the solenoid 113 to its initial position after de-energization of the latter, and consequently the member 108 into clutching engagement with the right hand gear 104 upon the breaking of the circuit to the solenoid 113. The shaft 103 projects outside of the box 99 and carries a gear 116 (Figs. 1, 11, 12 and 13) at its end which meshes with a gear 117 secured to one end of a rotatable shaft 118 journaled in the box 99, the opposite end thereof being bored out as indicated at 119 and having secured thereto a bevel pinion 122 meshing with a bevel gear 123 secured to a shaft 124 disposed at right angles to the shaft 118 and journaled in the box 99. The shaft 124 extends through a wall of the box 99 and is rotatably coupled as indicated at 125 to a continuing shaft 126 carrying at its opposite end a bevel pinion 129 (Figs. 1 and 3). The pinion 129 meshes with a bevel gear 130 rotatably supported in the frame 50 below an upwardly extending hollow column 131. Secured for rotation with the gear 130 is a sprocket wheel 132 connected by a sprocket chain 133 with a similar sprocket wheel 134 rotatably supported upon the upper end of the column 131. Mounted upon the same shaft carrying the sprocket wheel 134 but outside of the hollow column 131 is a sprocket wheel 135 (Fig. 30) which directly drives the endless conveyor belt 84, the opposite end of the belt 84 being supported upon an idle sprocket wheel 136 (dotted outline Fig. 29). This completes the description of the drive from the main drive shaft 54 to the braiding head 60 and the conveyor belt 84, and it will readily be apparent upon the disengagement of the clutch 72 that both the braiding head, conveyor belt and timing and tripping mechanism will cease to operate in addition to a reel 137 for taking up the completed cords which receives motion from the shaft 126. The drive from the shaft 126 to the reel 137 will be described hereinafter.

*Drive to conductor feeding, elevating, cutting and gathering mechanisms.*

The sprocket wheel 67 (Fig. 2) which, as hereinbefore mentioned, is driven from the main drive shaft 54 is secured to a shaft 139 journaled at opposite ends upon a bracket 140 and a housing 141 respectively. Within the housing 141 is a clutch 142 (Fig. 9) by means of which the conductor feeding, elevating, cutting and gathering mechanisms are rendered operative and inoperative. Upon the shaft 139 within the housing 141 is a worm 144 meshing with a worm wheel 145 rotatably free upon a shaft 146. Carried upon but secured for rotation with the shaft 146 by a key 147 is a jaw clutch member 148 adapted to be engaged with a jaw clutch member 149 integral with the worm wheel 145 whereby the shaft 146 will be caused to rotate, the members 148 and 149 forming the clutch 142. Formed in the periphery of the member 148 is a circular channel 152 which extends clear around the member except at one point indicated by a wall 153 (Figs. 9 and 10). The right vertical wall of the channel 152 is provided with a cam portion 154. One end of a reciprocably mounted pin 155 is normally positioned within the channel 152 and in engagement with the wall 153, but is retracted to the position indicated in dotted outline (Fig. 8) at predetermined intervals by the timing and tripping mechanism 81, whereupon a compression spring 156 mounted upon the shaft 146 between the member 148 and a shouldered collar 157 backed by the housing 141 slides the clutch member 148 into engagement with the member 149 thereby causing the shaft 146 to rotate. One end of the pin 155 extends from the housing 141 and is operatively engaged by a shifting fork 160 which is clamped as indicated at 161 to a reciprocable rod 162, the movement of which toward the left to retract the pin 155 from the channel 152 is controlled by the timing and tripping mechanism 81. The rod 162 extends within the housing 141 and at a point therein has a collar 163 secured thereto which is engaged by a dog or tooth 164 secured to the periphery of the member 148 as the latter rotates in a clockwise direction upon being engaged with the member 149. The tooth 164 engaging the collar 163 causes the rod 162 to be moved toward the right, thereby moving the pin 155 into the channel 152 formed in the member 148, and as the latter continues to rotate the pin 155 riding adjacent the right vertical wall of the channel finally engages the cam portion 154 and moves the member 148 toward the right and disengages the clutch member 148 from the member 149, the member 148 ceasing to rotate upon the wall 153 engaging the pin 155, as clearly shown in Fig. 10. During the disengagement of the members 148 and 149, energy is stored in the spring 156 which is released when the pin 155 is retracted from the channel 152, as hereinbefore described. The shaft 146 at its left end (Fig. 1) carries a crank arm 167, the lower end of which is provided with a pin 168 riding in a horizontally disposed slideway 169 formed in a cross slide 170 mounted upon a pair of vertically disposed guide rods 171 (Fig. 2) suitably secured to the frame 50. Connected to the cross slide 170 at a point intermediate the guide rods 171 and in line therewith by a ball and socket connection indicated by the numeral 174 (Fig. 2) is a link rod 175. The upper end of the link rod 175 is connected by a similar ball and socket connection 176 (Figs. 2 and 23) to a reciprocably mounted sleeve member 177 of a conductor feeding and elevating mechanism 178 (Figs. 23 to 28 inclusive), the details of which will be described hereinafter.

The conductor cutting and gathering mechanism drive will now be described: The right hand end of the shaft 146 (Fig. 1) is journaled in a bracket 185 and secured to the shaft 146 at either side thereof are cam wheels 186 and 187 (Figs. 14 and 15). The cam wheel 186 is of the box type being provided with a cam channel 188 within which rides a roller 189 secured intermediate the ends of a lever 192. A roller 193 secured to the lower end of a second lever 194 rides upon the periphery of the cam wheel 187 (Fig. 15), the levers 192 and 194 being pivoted upon a common stud 195 integral with the bracket 185. The levers 192 and 194 are each connected as indicated at 198 and 199 by ball and socket connections to one end of a pair of adjustable link rods 200 and 201 respectively, the opposite ends of the link rod 200 and 201 being similarly connected by ball and socket connections 202 and 203 to arms 206 and 207 respectively. The arms 206 and 207 are secured to the lower ends of a vertically extending rod 208 and tube 209 respectively, the rod being mounted in the tube 209 and adapted to oscillate independently thereof. A compression spring 210 mounted around the link rod 201 between a collar 213 backed by a pair of nuts threaded onto the rod 201 at one end and a similar collar backed by a bracket 214 at the opposite end, serves to hold the roller 193 at all times against the periphery of the cam wheel 187. Due to the roller 189 riding in the cam channel 188 no spring is necessary to retain it therein.

The rod 208 is journaled at its lower end in a bracket 215 while the tube 209 is journaled upon the rod and rests at its lower end upon the bracket 215, as clearly shown in Fig. 15. The rod 208 and tube 209 extend upwardly to a point approximately in line with the top of the column 131 (Fig. 1) with the tube freely passing through a bearing or journaled portion 216 formed upon the column 131 (Fig. 1). The rod 208 extends a short distance above the upper end of the tube and secured thereto by a pin 217 is an arm 218 which rests upon the upper end of the tube 209 whereby the rod is supported upon the tube, the tube in turn being supported at its lower end, as hereinbefore described, upon the bracket 215. Secured to the tube 209 below the arm 218 is a second arm 221.

Secured to a bracket 222 suitably mounted upon the end of the column 131 is a conductor cutting and gathering chuck 223. The chuck 223, as clearly shown in Figs. 1 and 3, is positioned above and in axial alinement with the braiding head 60. The chuck (Figs. 17 and 18) carries at its upper end a circular plate 224 provided with an arm 225, and at its lower end a ring-like member 228 provided with an arm 229, the arms 225 and 229 being connected to the arms 218 and 221 respectively by link rods 230 and 231 respectively (Figs. 1 and 3).

This completes the description of the drive from the main drive shaft 54 to the conductor feeding and elevating mechanism 178 and the conductor cutting and gathering chuck 223, and from the description as hereinbefore given it will be readily apparent that upon the shaft 146 being caused to rotate one revolution as hereinbefore pointed out, the crank arm 167 secured to one end thereof will operate the cord feeding and elevating mechanism 178 through one complete cycle of operations. Also through the cams 186 and 187 secured to the opposite end of the shaft 146 the conductor cutting and gathering chuck 223 will be operated in proper sequence and returned to its normal position.

*Drive to timing and tripping mechanism.*

Figure 11:
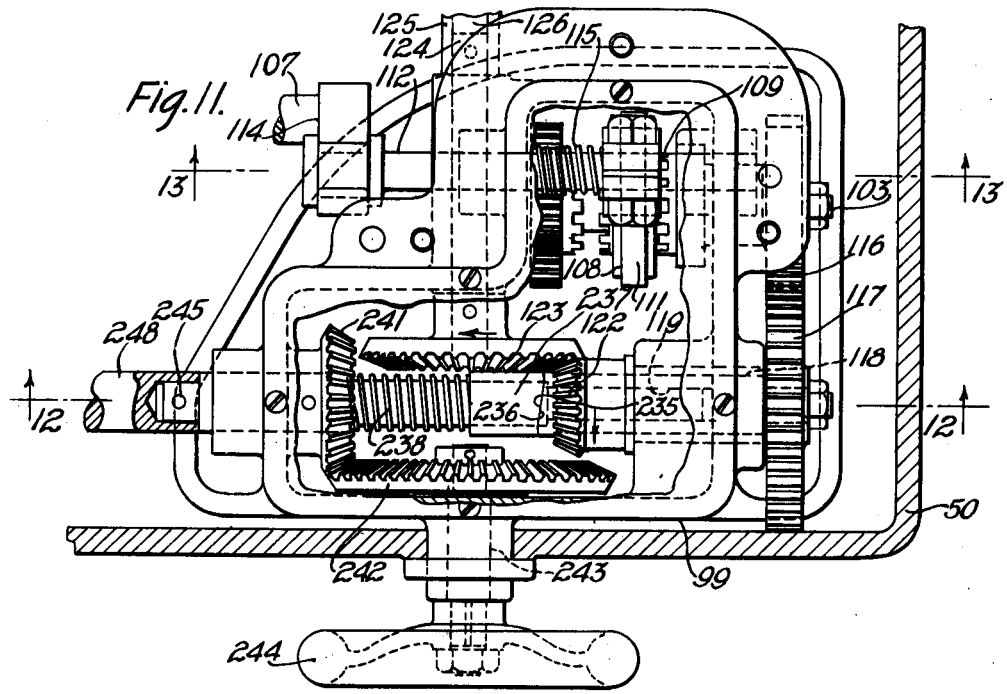
Fig. 11 is an enlarged detail sectional plan view of the timing gears on the line 11—11 of Fig. 2 looking in the direction indicated by the arrows.
Figure 12:
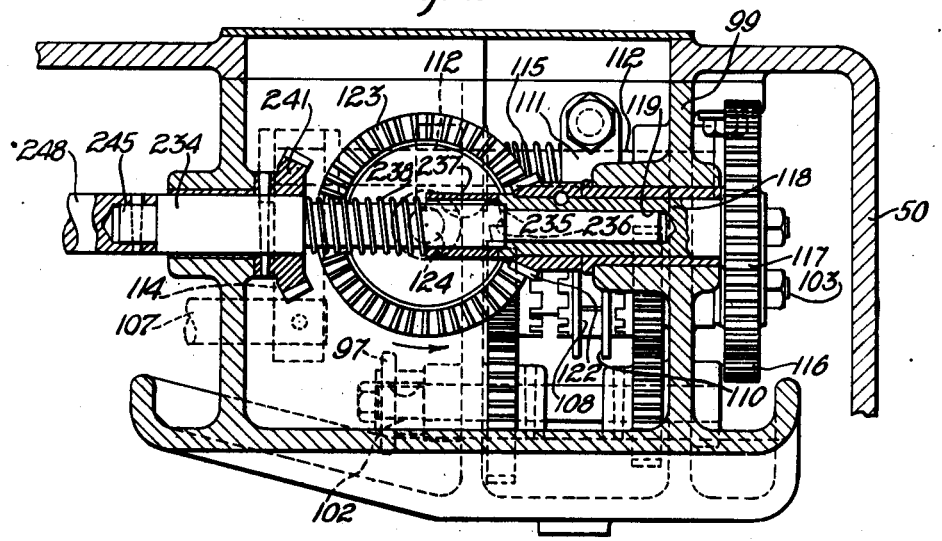
Fig. 12 is a vertical sectional view on the line 12—12 of Fig. 11 looking in the direction indicated by the arrows.

Referring to Figs. 11 and 12, the shaft 118 as hereinbefore pointed out is bored out as indicated at 119. Journaled in the housing 99 at one end and in the bore 119 at its opposite end is a shaft 234. Upon the end of the shaft 118 adjacent the bevel pinion 122 secured thereto is formed a one tooth ratchet clutch surface 235, which in the normal operation of the machine is in driving engagement with a similar clutch surface 236 formed upon a sleeve 237 splined to the shaft 234. A compression spring 238 mounted around the shaft 234 between the end of the sleeve 237 and a bevel gear 241 secured to the shaft 234 inside of the housing 99 serves to normally retain the clutch surfaces 235 and 236 in driving engagement, as shown in Figs. 11 and 12. Meshing with the bevel gear 241 is a bevel gear 242 secured to one end of a shaft 243, the opposite end of the shaft extending through the front walls of the housing 99 and frame 50 and carrying a hand wheel 244 thereon. Coupled to the shaft 234 as indicated at 245 is a continuing shaft 248 which, as clearly shown in Fig. 3, extends across the front of the machine for the greater portion of its width and is journaled at its left end in a bearing block 249 (Fig. 6). The shaft 248 is provided with reverse screw threads or grooves 250 for the greater portion of its length (Figs. 5 and 6), whereby a carriage 251 mounted thereon and carrying a thread follower 252 (dotted outline Fig. 39 and Fig. 7) which fits into the reverse screw threads 250 of the shaft 248 is given a uniform reciprocating rectilinear horizontal motion from the uniform rotary motion of the shaft 248 in a well known manner.

It will be readily apparent that upon rotation of the shaft 118 which receives its motion as hereinbefore described in connection with the description of the drive to the conveyor belt 84, the shaft 248 will be caused to rotate through the associated ratchet clutch surfaces 235 and 236 and thereby set in motion the timing and tripping mechanism 81 which is controlled by the reciprocation of the carriage 251 upon the shaft 248. The purpose of the ratchet clutch drive between the shafts 118 and 248 is to permit the timing and tripping mechanism 81 to be run by hand through its cycle of operations at a speed greater than its normal operating speed, which at times it is desirable to do, for instance, in case of the operator observing a defect in an uncompleted cord for one reason or another or if the supply of conductors should run out before the cord was finished. In any of such cases the operator may grasp the hand wheel 244 and revolve it quickly in a counter-clockwise direction, which will through the bevel gears 242 and 241 cause the shaft 248 to be revolved at a relatively faster speed than its normal operating speed, the ratchet clutch it will be readily understood permitting this independent rotation of the shaft 248 and there- by advancing the mechanism to a point for beginning at a predetermined point its cycle of operations.

Drive to take-up reel.

As hereinbefore mentioned, the take-up reel 137 receives its motion from the shaft 126 to which is secured a spiral gear 255 (dotted outline Fig. 1) meshing with a spiral gear 256 fixed to a shaft 257 (Fig. 41) extending downwardly toward the base of the machine. At its lower end the shaft 257 carries a spiral gear 258 (Fig. 1) which meshes with a spiral gear 259 fixed to one end of a horizontally disposed shaft 262, the opposite end of the shaft 262 carrying a bevel pinion 263 meshing with a bevel gear 264 fixed to the lower end of a vertically extending shaft 265, the shafts 257 and 265 being suitably journaled in the frame 50. The upper end of the shaft 265 extends through the frame 50, and secured thereto is a turn-table 266 provided upon its upper surface with a ring 269 composed of some suitable friction material. Resting upon the ring 269 is a slip plate 270 to which is adapted to be locked the take-up reel 137, the axis of the slip plate 270 being suitably secured from axial displacement relative to the turn-table 266 and shaft 265. As clearly shown in Fig. 1, the finished cords pass downwardly from the belt 84 and into the mouth of a tube 271 indicated in dotted outline in Fig. 1 as extending from the base of the column 131 to a point substantially in line with the top surface of the slip plate 270. Intermediate the outlet end of the tube 271 and the reel 137 is a pulley 272 fixed to a block 273 (Fig. 41), which is given a uniform reciprocating rectilinear vertical motion from the uniform rotary motion of the shaft 256 in a manner similar to that described in connection with the carriage 251 of the timing and tripping mechanism 81. The reciprocable movement given to the pulley 272 serves to distribute the completed cords upon the reel 137 in even layers of uniform spirals, and the friction drive for the reel provided for by the plate 270 supporting the reel and bearing upon the ring 269 causes the cords to be taken up upon the reel with a uniform tension, as will be readily understood. As hereinbefore mentioned, the rotation of the take-up reel 137 is controlled through the operation of the clutch 72.

Timing and tripping mechanism.

In the description of the drive to the timing and tripping mechanism 81 heretofore given, it was shown that the carriage 251 will be reciprocated in a horizontal direction upon the rotating shaft 248. The carriage comprises a main body member 276 and a cover plate 277 (Figs. 6, 7 and 39)

mounted upon a slideway 278 fixed to the frame 50. Alined circular openings 279 and 280 are formed in the cover 277 and member 276 respectively, the opening 279 being shouldered as indicated at 283. Carried in the openings 279 and 280 is a circular pivotal rod 284 having a flange 285 intermediate its ends which fits the shoulder 283 of the cover, thereby preventing longitudinal displacement of the rod when assembled with the body member 276 and cover 277, the cover being retained in position upon the body member and the whole upon the slideway 278 by a plurality of screws 286. Formed upon the right hand end face of the rod 284 as viewed in Figs. 7 and 39 is the projecting blade or thread follower 252 which rides in the reverse screw threads or grooves 250 formed in the shaft 248. The left hand end of the rod 284 is provided with a reduced axially alined portion 290 to which is secured an arm 291 having a pin 292 at its free end. Extending rearward from the inside of the front wall of the frame 50 in front of the carriage 251 and in the path of the pin 292 are spring-like blades 293 and 294, which upon the pin 292 contacting therewith in its movement in either direction causes the rod 284 to be rocked and thereby reverses the position of the thread follower 252, and consequently the direction of the movement of the carriage 251 in a well known manner. The periphery of the rod 284 is provided with a pair of notches 295 and adapted to alternately engage therein is a spring pressed plunger 296 mounted in the cover 277, which serves to retain the thread follower 252 in its reversed position upon being actuated by the pin 292 contacting with either of the blades 293 or 294. The position of the blade 294 relative to the blade 293 determines the length of the body portion of the cord. Therefore, the blades 293 and 294 are adapted to be adjustably mounted upon the frame 50 in the following manner: The blades are each fixed to a block 297 provided with a stud-like portion 298 projecting through a slot 299 formed in the front wall of the frame 50, the end of the stud 298 having a threaded portion adapted to receive a nut 300. A marker plate 301 is clamped between the nut 300 and frame for indicating the length of the body portion of the cord being braided in association with a suitable scale indicated by the numeral 302 provided upon the front wall of the frame (Fig. 2). The distance between the marker plates 301 is shorter than the actual length of the body portion of the cord which it represents, but it will be apparent from the operation of the apparatus to be hereinafter given that it serves as a relative indication of the actual length of the body portion of the cord, the scale 302 being in proportion. The position of the blade 293 after its initial setting is never changed, the adjustment for different lengths of body portions being made by varying the position of the blade 294. A second slot 305 is formed in the frame below the slot 299 as clearly shown in Fig. 2 and projecting therethrough is a stud 306 secured to the carriage 251 as clearly shown in Figs. 7 and 39, a pointer 307 being seated upon a shoulder formed upon the stud 306 and retained thereon by a nut 308. The pointer 307 travels with the carriage and serves to indicate in co-operation with a suitable indication upon the scale 302 to the operator when resetting the timing and tripping mechanism, as hereinbefore described in connection with the description of the drive to the timing and tripping mechanism, when the mechanism is at a point ready to begin another cycle of operations.

Pivotally carried in the body member 276 of the carriage 251 upon a stud 311 is a lever 312 which is fixed to the stud, the lever projecting rearwardly through a suitable slot 313 formed in the rear face of the member 276 as viewed in Fig. 6. Secured to the right hand end of the stud 311 is an arm 314 and associated with the free end thereof is a spring 315 which serves to normally rock the lever 312 in a counter-clockwise direction as viewed in Fig. 6, the normal position of the lever 312 being indicated in dotted outline. The full line position of the lever 312, as shown in Fig. 6, is the position it assumes during the movement of the carriage 251 toward the left at one stage in the operation of the timing or tripping mechanism to be fully described hereinafter. This is the extent of its movement clockwise, it being limited by the wall of the slot 313. Suitably carried upon the underside of the top surface of the frame 50 and at the rear of the carriage 251 is a housing member 318 (Figs. 6, 7 and 40) upon the bottom face of which is reciprocably carried a trigger plate 319 provided with a right angle extension at one end as indicated at 320. The plate 319 is reciprocably carried upon a T-shaped member 321 (Figs. 7 and 40) fixed to the bottom face of the housing member 318, an arm of the member 321 extending into a slot 322 (Figs. 6 and 40) formed in the plate 319 and thereby forming a slideway for the plate 319 during its reciprocable movement to be described hereinafter. Upon the right hand face of the plate 319 (Fig. 7) is fixed a bracket 323 and reciprocably carried in arms 324 at opposite ends thereof is a rod 325. Surrounding the right-hand end of the rod 324 outside of the arm 324 (Fig. 6) is a coiled compression spring 326, the spring being retained upon the rod under suitable compression between a washer 327 and the arm 324 by a pair of nuts 328 screw threaded upon the rod. Upon the opposite end of the rod and abutting the arm 324 is a button-like member 329 (Figs. 6, 7 and 40). It will be readily apparent that the spring 326 will normally retain the member 329 against the arm 324 as indicated in Figs. 6 and 40. Adjustably clamped upon the rod 325 between the arms 324 of the bracket 323 is a finger 330 which normally lies in the path of the lever 312 during its movement with the carriage 251.

Pivotally secured to the housing 318 as indicated at 333 is a trigger 334 (Fig. 40), which in its normal position is latched over a shoulder portion 335 formed upon the trigger plate 319 with a pin 336 (Figs. 4, 6 and 40) carried thereby engaging an end face of the button-like member 329. A coiled compression spring 337 secured at opposite ends to arms upon the trigger 334 and housing 318 serves to normally urge the trigger 334 in a clockwise direction into its latched position as shown in Figs. 6 and 40. When unlatched the trigger 334 contacts with the side edge of the plate 319 below the shoulder portion 335 thereof (Fig. 40).

Adjustably secured to the right angle extension 320 of the plate 319 as indicated at 338 is a bifurcated member 340 and pivotally carried between the arms thereof is one end of a link rod 341, the opposite end of the rod having a pivotal connection with a short arm of a bell crank lever 342 (Fig. 3). A long arm of the bell crank lever 342 is connected to the reciprocable rod 162 by a link 343 secured at one end to the arm and with its opposite end to a bifurcated member 344 pivotally carrying between arms thereof the left end of the reciprocable rod 162 (Figs. 2 and 3). Referring now particularly to Fig. 3 it will be seen that the shifting fork 78 of the braiding head clutch 72 is connected to the right end of the reciprocable rod 162 by a link 345 and a bifurcated member 346. Also as hereinbefore set forth through the fork 160 clamped to the rod 162, the pin 155 of the elevator drive clutch (Figs. 8, 9 and 10) will be operated with the reciprocable rod 162 to cause the engagement or disengagement of the members 148 and 149. Carried in a bore 349 (Figs. 6, 7 and 40) formed in the member 318 is a plunger rod 350 engaging at one end a coiled compression spring 351 and at its opposite end an end of the bifurcated member 340. As illustrated in Figs. 6, 7 and 40, with the trigger 334 in its latched position the spring 351 is under compression and upon a movement of the member 329 toward the left as viewed in Fig. 6 and toward the right as viewed in Fig. 40, which member is in contact with the pin 334 carried by the trigger 334, it will be apparent that the trigger will be unlatched from the plate 319, and due to the force stored in the spring 351 the plunger rod 341 will be operated and thereby through the link and leverage mechanism heretofore described the braiding head clutch 72 and elevator drive clutch 142 will be rendered inoperative and operative respectively.

Figure 4:
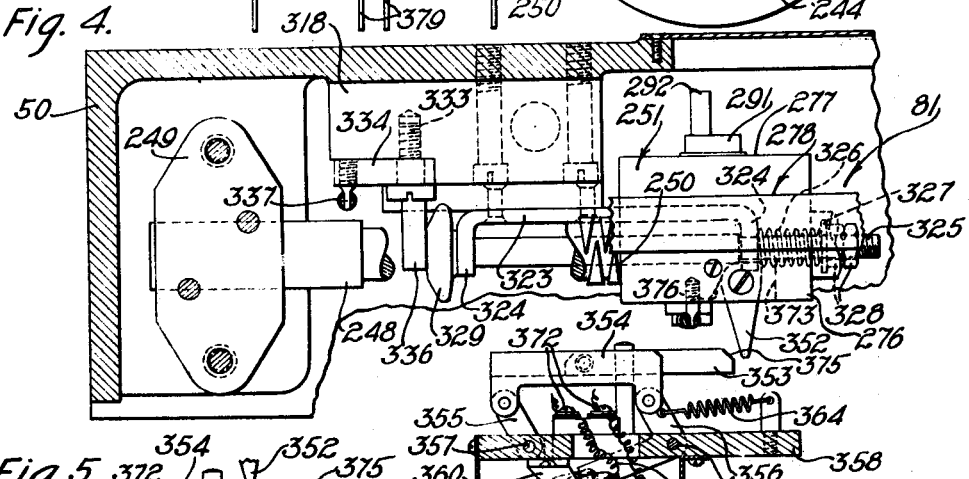
Fig. 4 is an enlarged fragmentary detail elevational view, partly in section, of the timing and tripping mechanism on the line 4—4 of Fig. 3 looking in the direction indicated by the arrows.

The carriage 251 carries a pivotal finger 352 upon its underside (Fig. 4) adapted in the movement of the carriage toward the left, as viewed in Fig. 4, to engage a plate 353 secured to a frame 354 in turn carried upon the upper ends of the levers 355 and 356 pivotally supported as indicated at 357 upon a bracket 358 secured to the frame 50 (Fig. 7), the plate 353 being adjustably positioned in a slot (dotted outline) formed in the upper face of the frame 354. A bracket 360 depending from the underside of the bracket 358 pivotally supports a mercury switch member 361, to be described in greater detail hereinafter. An arm 362 fixed to the member 361 and equipped with a pin 363 engages with a forked end of the lever 356 and thereby causes the member 361 to be rocked in a clockwise direction upon the bracket 360 when the plate 353 is moved toward the left (Fig. 4) in the operation of the timing and tripping mechanism to be described in greater detail hereinafter. A tension spring 364 with opposite ends secured to the lever 356 and bracket 358 serves to yieldably hold the plate 353 in its normal position as shown in Fig. 4 in which position the contacts of the switch 361 are open. The switch member 361 comprises a sealed glass container 368 containing mercury indicated at 369, and a pair of contacts 370 suitably carried within the container at the right end (Fig. 4) and connected by flexible conductors 371 to binding posts 372 supported upon the bracket 358. One of the binding posts 372 may be connected direct to one side of a current supply (not shown) while the other post 372 is connected to one terminal of the magnetic solenoid 113, the winding thereof being included in the circuit. The other terminal of the solenoid is connected to the other side of the current supply, and it will be readily apparent upon the member 361 being rocked to the position shown in Fig. 5 that the mercury 369 will flow between the contacts 370 and thereby close the circuit through the magnetic solenoid 113 (Fig. 3). By varying the position of the plate 353 upon the frame 354 it will readily be apparent that the time of closing the switch 361 may be advanced or delayed relative to the position of the carriage 251.

Figure 5:
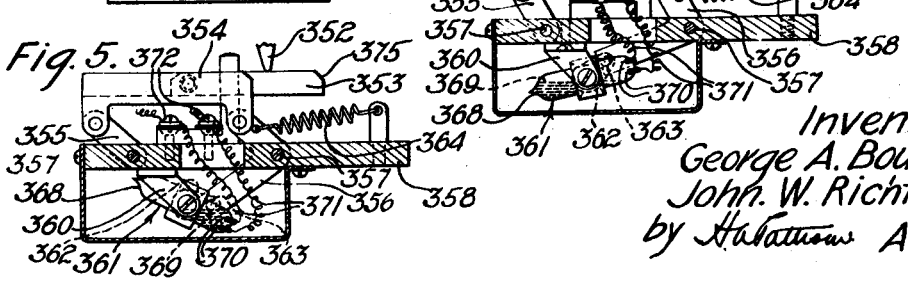
Fig. 5 is a fragmentary detail view thereof showing a mercury switch associated therewith in a closed position.

The finger 352 is pivoted within a slot 373 formed in the bottom of the carriage 251 and assumes its normal position against a wall of the slot as indicated in Fig. 4 due to the action of gravity. In the movement of the carriage 251 to the left (Fig. 4) the finger 352 will engage an inclined face 375 of the plate 354, and due to the engagement of the finger with the wall of the slot it is prevented from turning upon its pivot in a counter-clockwise direction with the result that the plate 354 is moved toward the left and downwardly upon the levers 355 and 356 (Figs. 4 and 5). In the continued movement of the carriage 251 toward the left the end of the finger 352 rides along the upper face of the plate 353 and the frame 354 (Fig. 5) until it rides off the left end of the latter, whereupon the spring 364 serves to return the plate 354 and associated levers, etc. to their normal position as indicated in Fig. 4, thereby causing the solenoid 113 to become de-energized. During a movement of the carriage 251 toward the right after its movement toward the left, as just described, the finger 352 will engage the left end of the frame 354 and turn upon its pivot in a clockwise direction and ride along the top surface of the frame 354 and plate 353 without causing a movement thereof, the slot 373 being formed as indicated at 376 to permit this action.

*Conductor feeding and elevating mechanism.*

The individual insulated conductors 40 are supplied from a pair of reels 379 rotatably mounted upon brackets 380 secured to the front wall of the frame 50 adjacent the base thereof (Figs. 1 and 2). From the reels 379 the conductors 40 are led upwardly through suitable guides 381 fixed in the frame 50 and thence are threaded through the conductor feeding and elevating mechanism 178, and in the operation of the machine past the braiding point of the head 60, through the conductor cutting and gathering chuck 223, onto the conveyor belt 84, through the tube 271, and finally distributed upon the take-up reel 137 in the form of a string of cords having the form illustrated in Fig. 32.

The conductor feeding and elevating mechanism 178 will now be described. Referring to Figs. 23 to 28 inclusive, the sleeve member 177 is reciprocably mounted in a bearing sleeve 382 suitably fixed to a stationary frame of the braiding head 60 and disposed axially thereof. Attached to the sleeve 177 at the lower end thereof is a cup-shaped member 383 which with the upper end of the link rod 175 forms the ball and socket connection 176. Suitably secured to the member 383 at diametrically opposite points (Fig. 27) is a pair of upwardly extending hollow needles 384 through which the conductors 40 are threaded from the lower end thereof to a point a short distance from the upper end and then through a slot 385 formed in the walls thereof. The slots 385 are so shaped that in initially threading the needles preparatory to starting the machine, the upper ends of the conductors 40 will readily pass from the hollow bore of the needles and through the slots to the outside of the needles as clearly shown in Figs. 33 to 38 inclusive. The needles are also each secured to the sleeve 177 near the upper end thereof by means of a block 386 fixed to the needles and entered within a circular channel 387 formed in the sleeve 177, the blocks in turn being secured to the sleeve 177 by screws as clearly indicated in Fig. 24. At certain periods in the operation of the machine a short length of the conductor 40 extends through the slot 385, and during these periods it is necessary to support the conductor in the needle otherwise due to its weight, or other causes, the free upper end thereof would be drawn inwardly through the slot 385 and necessitate the stopping of the machine to re-thread the conductor through the slot. The means for supporting the conductors in the needles 384 during the hereinbefore mentioned periods comprises the following: Fixed to the inner wall of the stationary sleeve 382 intermediate its ends is a cam strip 388 and pivotally supported in the sleeve 177 is a bell crank lever 389. One end of the lever 389 is adapted to engage the cam strip 388, while the other end has a pivotal connection with one end of a rod 390 disposed axially within the sleeve 177. The sleeve 177 is slotted as indicated at 391 to permit the necessary movements of the sleeve 177 and lever 389 during the operation of the machine. The upper end of the sleeve 177 is shouldered, and fitting therein flush with the upper surface of the sleeve 177 is a cup-shaped member 392 through which the upper end of the rod 390 extends. Secured to the upper end of the rod 390 is a disc 393, and surrounding the rod 390 between the under surface of the disc and the bottom of the cup 392 is a coiled compression spring 394 normally acting to move the rod 390 upwardly. Upon the upper surface of the cup 392 is a pair of levers 395 which are pivotally supported intermediate their ends. One lever is associated with each of the needles 384 with an end thereof extending into the hollow thereof through a slot 397 formed in the wall of each of the needles. The opposite ends of the levers are disposed below the disc 393 (Fig. 28) and are engaged therewith during the period in which the lever 389 is engaged with the cam strip 388. Tension springs 398 suitably associated with each of the levers 395 serve to move the levers clockwise when the lever 389 rides off the cam strip 388 near the extreme end of its movement upward, thereby moving the free ends of the levers 395 into gripping engagement with the conductors 40. Positioned above the levers 395 and carried upon the sleeve 177 by studs 399 (Fig. 23), one of which is indicated, is a disc 400 which serves as a stop for the disc 393 when the lever 389 rides off the cam strip 388 and also as a cover for the sleeve 177. The stationary sleeve 382 is cut out as indicated at 401 (Figs. 1 and 33 to 38 inclusive) for the purpose of allowing the operator to view the upper end of the needles to facilitate the proper threading thereof. In the position of the conductor feeding and elevating mechanism, as shown in Figs. 1 and 23, the needles are at rest and the conductors 40, as will be more fully described hereinafter, are being drawn upwardly through the needles, consequently as is clearly shown in Fig. 23 the lever 389 is engaged with the cam strip 388 and the rod 390 has been drawn downwardly thereby compressing the spring 394, and by means of the disc 393 engaging the levers 395 the opposite ends thereof have been moved against the action of the torsion springs 398 out of engagement with the cords 40. In the operation of the machine the needles are moved upwardly a predetermined distance, and during such movement the lever 389 rides off the cam strip 388 whereupon the spring 394 moves the rod 390 upwardly and the levers 395 are rocked in a counter-clockwise direction to press the ends thereof projecting into the slots 397 into engagement with the conductors 40 with sufficient force to clamp them against the inner wall of the needles and hold them from moving downward.

*Conductor cutting and gathering mechanisms.*

The conductor cutting and gathering mechanism 223 as hereinbefore described is supported by the column 131 above and in axial alinement with the braiding head 60. It is also in axial alinement with the conductor feeding and elevating mechanism 178, the needles 384 thereof in the operation of the machine being projected upwardly and therethrough to the position indicated in Fig. 34.

The mechanism 223 comprises a cylinder 404 provided at its lower end with a cap 405 having mounted therein for oscillatory movement the ring-like member 228 hereinbefore referred to. Formed upon the inner vertical wall of the ring 228 at diametrically opposite points are gear teeth 406 which mesh with gear segments 407 formed upon a pair of levers 408 pivoted at diametrically opposite points upon the cap 405. Suitably spaced from the ring member 228 and supported from the cap 405 is a cover plate 409. Formed in the plate 409 and the parallel spaced bottom wall of the cap 405 is a curved slot 410 which extends from opposite points of the inner surface of the cylinder 404 and across the axis thereof. The curvature of the slot 410 coincides with the path taken by the free ends of the levers 408 when moved inward toward the axis of the cylinder to the position clearly shown in Fig. 21. Reciprocably mounted in the bottom wall of the cap 405 is a pair of stop pins 411, which in operation are moved horizontally and in opposite directions. The pins 411 pass through suitable slots formed in the levers 408 and carry downwardly extending studs 412 which extend into slots 413 formed in the levers 408. It will readily be apparent upon rocking the arm 229, which is integral with the ring 228, in a counter-clockwise direction from the position indicated in Fig. 21 to that shown in Fig. 20, that the teeth 406 of the ring meshing with the gear segments 407 of the levers 408 will cause the latter to be rocked also in a counter-clockwise direction, and simultaneously therewith the pins 411, through the studs 412 engaging in the slots 413 of the levers 408, will be moved toward the axis of the cylinder 404 to occupy substantially the same space formerly occupied by the free ends of the levers 408. The free ends of the levers 408 in moving toward each other along the slot 410 serve to gather the conductors 40 and move them toward the axis of the cylinder 404 at predetermined periods in the operation of the machine, while the pins 411 serve to prevent the braiding threads 414 from moving above the braiding point, which is just below the mechanism 223, during the last portion of the movement upward of the needles. These movements will be fully described hereinafter in the description of operation of the machine.

At its upper end the cylinder 404 carries a cap 416 positioned upon a shoulder formed in the cylinder wall with its upper surface flush with the top edge thereof and secured in position by a plurality of screws, one of which is indicated in Fig. 18. Formed axially upon the cap 416 is a raised circular portion 417 upon which is journaled for oscillatory movement the circular plate 224 provided with the arm 225 as hereinbefore referred to. Secured to the cap 416 within a depression formed axially within the upper surface thereof is a pair of diametrically opposed stationary knife blades 418 indicated in dotted outline on Fig. 17 and shown in greater detail on Figs. 42 and 43, the cutting edges thereof being indicated at 419. Resting upon the upper surface of the blades 418 is the plate 224, the plate being held upon the cap 416 by screws 420 passing through slots 421 formed in the plate 224, the slots permit the oscillation of the plate in the operation thereof to be described hereinafter, and also serve to limit its movement either clockwise or counter-clockwise. The cap 416 and plate 224 are each provided at diametrically opposite points with slots 422 which, as indicated in Figs. 17 and 42, are in alinement. The slots in the plate 224 are each provided with a substantially right angle extension 423 to permit oscillation of the plate when the needles 384 have moved upwardly through the slots 422 during the operation of the machine. One side wall of each of the slots 422, as indicated at 425 (Fig. 42), is cut back at an angle from the bottom to the top surface of the plate 224 to form a knife edge, which with the stationary knife blades 418 forms a means for shearing the conductors 40 at predetermined intervals in the operation of the machine, as will be fully described hereinafter. The slots 422 and 410 are each provided with an enlarged alined circular portion 426 through which the needles 384 ride in their upward and downward movement.

Carried upon the inside wall of the cylinder 404 and at diametrically opposite points is a pair of conductor clamps 427 which serve to hold the severed conductor lengths at predetermined periods in the operation of the machine. Each of the clamps is identical in construction and operation, but as clearly shown in Figs. 33 to 38 inclusive the right hand clamp as viewed in these figures is mounted at the lower end of the cylinder 404 while the left hand clamp is positioned intermediate the ends thereof and above the right hand clamp. This arrangement serves to provide different length terminal positions 42 for one end of the particular type of telephone cord for which the machine illustrated is set up, but it will be apparent as the description progresses that by varying the vertical positions of the clamps 427 upon the cylinder that the relative lengths of the terminal portions 42 at one end of the cord may be varied to a nicety or they may be produced equal in length.

Each clamp comprises an irregular shaped block 428 secured in the desired vertical plane in the cylinder 404 by screws 429. Formed vertically in the block 428 is a circular slot 430 through which the needle 384 reciprocates. Pivotally mounted upon a vertical face 431 of the block is a lever 432 provided with a pair of clamping faces 434 and 435 and a finger 436, the lever being normally urged in a counter-clockwise direction as viewed in Fig. 22 by a coiled tension spring 437. The normal position of the lever 432 is indicated in Fig. 22, wherein the finger 436 has been projected into the slot 430 into the path of the needle 384 while the clamping face 434 is engaged with an angular face 438 which serves to limit the counter-clockwise movement of the lever 432 in response to the action of spring 437, the face 435 (dotted outline Fig. 22) being adjacent a face 439 substantially continuous with one side of the slot 430. During the operation of the machine and at predetermined periods, the terminal portions 42 of different length at one of the cord and the terminals 42 of equal length at the opposite end thereof are respectively clamped between the face 439 of the block 428, and the lever faces 435 and 434 as indicated in Figs. 37 and 35 respectively. Referring particularly to Fig. 22 the lever 432 is provided with a groove 440 into which a loop 443 in the terminal portion 42 of equal length moves during the braiding of the stay cord 44 as the string of cords moves upward during the braiding thereof. The pull upward on the loop 443 (Fig. 36) rocks the lever 432 clockwise and releases the clamped terminal 42 from between the lever clamping face 434 and the associated clamping face 439 of the block 428.

*Conveyor belt.*

Referring particularly to Figs. 29 and 30 which illustrate opposite ends of the conveyor belt 84 in plan view, the numeral 444 indicates an endless roller chain which at opposite ends passes around the sprocket wheels 135 and 136. The chain 444 comprises a plurality of alternately arranged links numbered 445, 446 and 447. The links 445 and 447 are identical with the exception that the link 445 at one side extends outwardly as indicated by the numeral 448 from a table portion 449 connecting the side members of the link. Upon the link 445 are mounted clamps 450, each clamp being pivotally mounted upon a pin 451 secured to the table portion 449 of the link. A torsion spring 452 suitably associated with the clamp 450 and pin 451 serves to normally urge the clamp in a clockwise direction (Figs. 29 and 30) and against the body portion 43 of the cord 39 being conveyed, thereby causing the cord to be clamped against the extension 448 of the link 445 as clearly indicated on Fig. 30. When not clamping the cord the clamping end of the clamp is engaged with the extension 448 of the link 445. Suitably supported upon the arm 131 adjacent each of the sprocket wheels 135 and 136 are arc shaped cam plates 455 and 456 respectively. As hereinbefore described, the sprocket wheel 135 is caused to rotate through the chain 133 and in the operation of the conveyor belt the underside thereof travels up and around the sprocket wheel 136 and a free end 457 of the clamp engages the cam plate 456 and causes its rotation counter-clockwise in the position clearly shown in Fig. 29. This permits the cord being pulled over a suitably supported guide pulley 458 to freely pass between the inside wall of the extension 448 and the clamp 450, and in the continued movement of the chain 444 the clamp rides off of the cam plate 456 and moves into clamping engagement with the cord, thereby causing the cord to be carried along with the chain 444. As the chain moves toward the right (Figs. 29 and 30) toward the sprocket 135, the free end 457 of the clamp engages the cam plate 455 and is rotated counter-clockwise to free the cord from the chain 444 so that it may, as hereinbefore described, freely pass downwardly and into the tube 271. The cam plate 455 is so designed that the clamps are held away from the extension 448 of the link 445 until it has rounded the sprocket and is well on its way toward the opposite sprocket 136. This is for the purpose of preventing the loose cord terminals 42 from being clamped and carried toward the left as the chain rounds the sprocket 135 upon the underside thereof.

The clamps 450 are so spaced upon the chain 444 that a plurality of them are at all times in clamping engagement with the body portion 43 of one of the cords 39, and in attaching the first cord braided to the conveyor belt upon setting the machine in operation it is clamped so that at no time will the stay cords 42 which connect one cord to the adjacent cord serve as a means to draw the string of cords through the machine. It will readily be apparent that the conveyor belt 84 will draw the cords past the braiding point of the head 60 at a fixed rate of speed during the braiding operation, thereby preventing any tendency of the cords to slacken or halt during the braiding operation which tends to produce a non-uniform braid.

The operation of the intermittent braiding machine hereinbefore described is as follows:

In the following description it will be assumed that the braided sheath 41 is just about to be completed upon the body portion 43 of a cord 39, as clearly indicated on Fig. 33, the opposite end of the cord being positioned upon the conveyor belt 84. At this stage in the operation the braiding head clutch 72 and elevator drive clutch 142 are engaged and disengaged respectively, as clearly shown in Figs. 16 and 9 respectively, with the needles 384 of the conductor feeding and elevating mechanism, the conductor cutting and gathering mechanism, and the various elements thereof positioned as shown in Fig. 33. The carriage 251 of the timing and tripping mechanism 81 is being moved toward the left, as viewed in Figs. 3, 4 and 6, through the rotation of the reverse screw threaded shaft 248, as hereinbefore described. The lever 312 carried by the carriage 251 has just engaged the finger 330, adjustably clamped upon the reciprocable rod 325 and the continued movement of the former results in the unlatching of the trigger 334 from the plate 319, the latter under propulsion of the spring 351 operating through the associated link and leverage mechanism to cause the disengagement of the braiding head clutch 72 and the applying of the brake associated therewith, and thereby bringing the braiding head 60 quickly to a standstill. Substantially at the instant of disengaging the clutch 72, but in fact just before the head comes to a standstill the elevator drive clutch 142 is engaged through the movement of the fork 160 carried by the rod 162 of the link and leverage mechanism, all as hereinbefore described. As the finger 330 moves with the plate 319 away from the lever 312 upon the unlatching of the plate the lever 312 immediately assumes the position shown in dotted outline on Fig. 6, due to the action of the spring 315, so that when the plate is latched again the finger 330 will be positioned at the right of the engaging end of the lever 312. The latter movement of the plate 319 will be described shortly.

The engagement of the clutch 142 causes the rotation of the shaft 146 which through the crank arm 167 carried upon its left end (Fig. 1), cross slide 170, link rod 175, and sleeve 177, results in the needles 384 being moved upwardly and thereby elevating the unsheathed conductors 40 threaded through the needles to the position shown in Fig. 34. It is, of course, understood that the head is at a complete standstill at the time the needles pass between the braiding threads 414. During the upward movement of the needles as just described and before they enter the cylinder 404 of the conductor gathering and cutting mechanism 223, the conductor gathering levers 408 thereof will have moved from the position clearly shown in Fig. 21, which position corresponds to the position thereof indicated in Fig. 33 to that indicated on Fig. 20, and simultaneously therewith the pins 411 will be moved from the position clearly shown in dotted outline on Fig. 21 to that shown on Fig. 20 which corresponds to the position shown on Fig. 34. The needles in moving upwardly enter the slot 430 of their associated clamp 427 and engage the finger 436 of the lever 432 and swing it upwardly, thereby clearing the slot for the passage of the conductor 40 therethrough to the position shown on Fig. 34. Upon the needles reaching the position indicated in full outline on Fig. 34, the plate 224 having the knife edges 425 (Figs. 17 and 42) formed thereon is rocked clockwise toward the stationary blades 418 (Figs. 42 and 43) to shear the conductors 40 projecting through the slots 422 of the plate 224 therebetween, thus forming the terminals 42 of equal length for one end of the cord about to be completed. The shearing operation occurs while the needles are in motion so that the conductors will be drawn taut during the shearing thereof, the extreme upward position of the needles being shown by the dotted outline position thereof indicated by the numeral 458 on Fig. 34. The conductor gathering and cutting mechanism is operated in timed relation to the conductor feeding and elevating mechanism through the cam wheels 186 and 187 (Figs. 14 and 15) carried by the shaft 146 and the associated link and leverage mechanism. The shearing operation leaves about an inch of conductor projecting from the needle, which is prevented from being drawn inwardly through the slot 385 due to the weight of the conductor or other reasons by the engaging end of the levers 395 (Figs. 23 and 28) contacting with the conductors when the lever 389 rides off the cam 388 as hereinbefore described. Preferably the levers 395 engage the conductors after the needles enter the cylinder 404 and before emerging therefrom at the upper end thereof to insure that the conductors will be moved up close to the underside of the pins 411 as shown in Fig. 34, thereby maintaining the braiding point at a predetermined plane. The length of conductors 40 projecting from the end of the sheathed body portion 43 form the terminal portions 42 at one end of the cord.

After reaching the position shown in dotted outline and indicated by the numeral 458 (Fig. 34) the needles are moved downwardly to their normal position as shown in Fig. 35 with the short lengths of the conductors extending therefrom. As the needles move downwardly they disengage the fingers 436 of the levers 432, thereby permitting the latter under the action of the springs 437 to move counter-clockwise to clamp the terminals 42 between the face 439 of the block 428 and the clamping face 434 of the lever 432 (Fig. 22) and thus prevent them from falling. As the needles emerge from the lower end of the cylinder 404, the levers 408 and pins 411 are immediately moved to the position thereof clearly shown on Fig. 21, the position of the levers 408 also being indicated on Fig. 35 with the terminal portions 42 of the cord gathered in against the completed body portion 43 thereof.

The next step in the continued operation of the machine is the braiding of the stay cord 44 which immediately commences upon the needles passing below the threads 414 and before the needles come to a rest at their normal position. The braiding head is set in motion through the dog or tooth 164 carried by the rotating clutch 142 (Figs. 8, 9 and 10) engaging the collar 163 upon the rod 162, the latter moving the pin 155 toward the right as viewed in Fig. 8 and into the channel 152 of the clutch member 148 in a manner fully described hereinbefore, thereby causing the disengagement of the clutch 142 and the latching again of the plate 319 with the trigger 334 through the operation of the associated link and leverage mechanism in a reverse direction to that imparted thereto in disengaging and engaging the clutches 72 and 142 respectively, hereinbefore described. The elapsed time between the disengagement and engagement of the braiding head clutch and the operation of the conductor feeding and elevating and cutting and gathering mechanisms, as just described, takes place in approximately two seconds, or the time it takes for the shaft 146 to rotate one revolution, as will readily be apparent.

As hereinbefore mentioned in the description of the telephone cord produced by this machine, it is desirable at the point where the sheathing 41 of the body portion 43 ends and the stay cord 44 begins or vice-versa to strengthen the braiding of the stay cord for a distance, which in the present instance is approximately one-half an inch, as indicated by the numeral 45 (Fig. 36). Upon the re-engagement of the clutch 72, as just described, the braiding of the stay cord begins with the same drawing speed thereof as was imparted to the body portion and thus continues until one-half inch has been braided, and thereafter the change speed mechanism 100 is operated to cause an increase in the drawing speed of the conveyor belt 84 and the take-up speed of the reel 137, the speed of the braiding head remaining constant. This serves to produce a tighter braid for the one-half inch of stay cord at its junction with the body portion, as will readily be apparent. The operation of the change speed mechanism 100 is accomplished in the following manner.

As the carriage 251 continues to move toward the left after the re-engagement of the clutch 72, the finger 352 (Fig. 4) pivotally carried upon the underside of the carriage 251 rides up the inclined face 375 of the plate 353 and moves the latter toward the left and downwardly upon the levers 355 and 356, as clearly shown in Fig. 5, and thereby through the mercury switch 361 and associated connecting leads (not shown), causing the energization of the magnetic solenoid 113, which through the resulting movement of the core of the solenoid, connection 114, rod 112, and yoke 111 shifts the clutch member 108 into engagement with the left hand gear 104 (Fig. 13), and as hereinbefore explained causing the shaft 126 to be rotated faster and thereby speeding up the drawing of the cord through the braiding head, and consequently a looser braiding for the balance of the stay cord 44 except at the end thereof adjacent the beginning of the next body portion 43. The take-up reel 137 being driven from the shaft 126 it is consequently speeded up in unison with the conveyor belt 84.

The drawing of the stay cord as it is braided continues at this increased speed and thus produces a relatively loose braid compared to the braid of the portion 45 thereof and, as will readily be apparent, results in a saving of braiding thread and an appreciable saving of time. The finger 352 continues riding along the upper face of the plate 353 and frame 354 until it rides off the left end of the latter, whereupon the switch 361 and associated elements are returned to the positions thereof shown in Fig. 4 by the spring 364. The solenoid 113 is therefore de-energized and the core 107 thereof along with the clutch member 108 are returned to their normal position by the spring 115. The return of the clutch member 108 to its normal position is timed to occur at the beginning of the last one-half inch of the stay cord. Thereafter the braiding of the stay cord continues at the normal drawing speed or the same speed at which the body portion 43 is drawn. Fig. 36 clearly shows the stay cord in process of being braided after the completion of the portion 45 with the terminals 42 thereof and the adjacent end of the body portion 43 of the cord having been drawn upwardly from between the ends of the gathering levers 408.

The lever 312 during the braiding of the stay cord, as was described hereinbefore, is positioned at the left of the finger 330 (Fig. 6) and in the continued movement of the carriage 251 toward the left the lever 312 engages the button-like member 329 carried upon the extreme left end of the rod 325 and in a manner identical to that described previously, in connection with the unlatching of the trigger 334 from the plate 319, when the lever 312 engaged the finger 330, the clutches 72 and 142 are disengaged and engaged respectively, the conductor feeding and elevating and gathering and cutting mechanisms being operated through their cycle of operation in substantially two seconds, as clearly described hereinbefore. While the shearing mechanism is operated at this period no shearing of the conductors occur, since the needles 384 merely raise the conductor ends previously severed as is clearly indicated by the dotted outline position of the needles on Fig. 37. During the movement of the needles downwardly from the dotted outline position thereof (Fig. 37) to the normal position shown in Fig. 38, the end of the conductor projecting from each of the needles is clamped between the face 439 of the block 428 and the lever face 435 as indicated on Fig. 37 and in dotted outline on Fig. 22. As the needle passes by the finger 436 of the lever 432 the latter is permitted to rotate counter-clockwise, it having been previously rotated clockwise when the needle was elevated, and during this counter-clockwise rotation the face 435 thereof engages the short end length of the conductor projecting from the needle and clamps it against the face 439. In the continued movement downward of the needles to their normal position as shown in Fig. 38, the conductors 40 are drawn from the needles due to the ends thereof being held as just described, thus forming the terminal portions 42 of unequal length for one end of the next cord to be formed. It will readily be apparent that due to the higher position of the left hand clamp 427 (Fig. 37) relative to the right hand clamp 427, that the cord 40 projecting from the end of the left hand needle 384 will be clamped as hereinbefore described before the cord projecting from the right hand needle will be clamped, thus causing a greater length of cord to be drawn from one needle than the other and therefore producing terminals 42 unequal in length.

As the needles emerge from the lower end of the cylinder 404 the levers 408 and pins 411 are moved to the positions thereof clearly shown on Fig. 21, the position of the levers 408 also being indicated on Fig. 38 with the terminal portions 42 gathered in against the completed stay cord 44. Upon the needles passing below the threads 414 (Fig. 37) the braiding head clutch is set in motion, in the manner hereinbefore set forth, and the braiding of the sheath 41 upon the body portion 43 of the next cord to be formed continues. At this period in the cycle of operations the lever 312 of the carriage 251 is positioned at the left of the button-like member 329 as indicated in dotted outline (Fig. 6). As the carriage continues to move toward the left the pin 292 associated with the thread follower 252, which as hereinbefore pointed out, is retained in a predetermined angular position relative to the threads 250 upon the shaft 248 during the movement of the carriage in either direction by the associated spring pressed plunger 296, engages the spring-like blade 293, thereby causing the position of the thread follower 252 to be reversed and consequently the direction of movement of the carriage 251. The braiding of the sheath thus is continued with the carriage moving toward the right until the pin 292 engages the right hand blade 294, which in a like manner causes the thread follower 252 to be again reversed. During the movement of the carriage toward the right the engaging end of the lever 312 merely engages the finger 330 and is rocked counter-clockwise. The braiding of the sheath thus continues until the lever 312 comes into contact with the right side of the finger 330, at which point the hereinbefore described cycle of operations commenced.

It will readily be apparent that the braiding of the body sheath 41 commences with the lever 312 at the left of the button-like member 329 (dotted outline Fig. 6) and continues until it engages the right hand side of the finger 330, at which point the description of operation just completed commenced, and also by moving the spring member 294 closer to or further away from the member 293 the length of the body portion 43 of the telephone cord will correspondingly be shortened or increased. In the continued operation of the machine the cycle of operations is repeated again and again until the supplies of conductors 40 and braiding threads 414 are exhausted.

The advantages of the machine, as hereinbefore described, are that it is continuous in operation requiring only to be supplied with material, it does not require an experienced operator as has been necessary heretofore in producing conductor assemblies of the aforementioned type, and that the output of the machine may be many times greater than that of an experienced operator.

What is claimed is:

1. In an apparatus for assembling strands, a plurality of continuous strand supplies, means for feeding the strands therefrom to an assembling position in predetermined end relation, means for applying a covering around an intermediate portion of the so positioned strands, means for advancing portions of the unassembled strands to predetermined points along the applied covering, and means for causing a severance of the strands thereat to provide free ends at the other end of the assembly.

2. In an apparatus for assembling strands, a plurality of continuous strand supplies, means for feeding the strands therefrom to an assembling position with the forward ends thereof in predetermined end relation, means for applying a covering to the so positioned strands along a portion thereof starting at a predetermined point from the said strand ends, means for causing said strand feeding means to thereafter advance portions of the unassembled strands to predetermined points along the applied covering, and means for causing a severance of the strands thereat to provide free ends at the other end of the assembly, the covering being extended from the end of one assembly to the next succeeding one to form a continuous chain of assemblies.

3. In an apparatus for assemblng strands, a braider, means for feeding a plurality of strands to an assembling position with the forward ends thereof in predetermined end relation above the braiding head for having a covering braided around the strands intermediate their ends, the feeding means thereafter advancing portions of the unassembled strands in predetermined end relation above the braiding head and along the covered intermediate portion of the assembly, means for causing a severance of the strands thereat, a connecting link of predetermined length being braided between successive strand assemblies, and means for causing the operation of the aforementioned strand feeding and severing means and the braider in timed relation to each other.

4. In an apparatus for assembling conductors, means for feeding a plurality of conductors to an assembling position in predetermined end relation, means for braiding a cover on the so positioned conductors intermediate their ends with predetermined lengths thereof extending from each end of the assembly and for braiding a connecting link between successive assemblies, means for conveying the work during the braiding of the cover and a predetermined length of the connecting link at junction points between the link and opposite ends of adjacent covers at a constant rate of speed and the intermediate portion of the connecting link at another speed in order to increase the closeness of the weave at the junction points, and means for causing the operation of the aforementioned means in timed relation to each other.

5. In an apparatus for assembling strands, a plurality of strand supplies, means for feeding the strands therefrom to an assembling position in predetermined end relation, means for applying a covering around an intermediate portion of the so positioned strands, means for causing a severance of the strands at predetermined distances from each end of the covering, means for causing the operation of the aforementioned means in timed relation to each other, and means for advancing the operation thereof to operate the apparatus to a predetermined point in its cycle of operation at a greater speed than its normal operating speed.

6. In an apparatus for assembling conductors, a plurality of conductor supplies, means for feeding the conductors therefrom to an assembling position with their forward ends elevated to a predetermined plane, means for braiding a cover on the so positioned conductors for a predetermined distance beginning at a predetermined point from their forward ends, means for elevating portions of the uncovered conductors to predetermined points along the braided covering, means for causing a severance of the conductors thereat to provide free ends at the other end of the assembly, a connecting link being braided between successive assemblies, and means for causing the operation of the aforementioned means in timed relation to each other.

7. In an apparatus for assembling conductors, a braider, a plurality of conductor supplies, means for feeding the conductors therefrom to an assembling position with their forward ends elevated to a predetermined plane above the braiding head, means for retaining said conductor ends thereat for having a braided covering applied to the so positioned conductors for a predetermined distance from their forward ends, the feeding means thereafter elevating portions of the unassembled conductors to predetermined points along the braided covering, means for causing a severance of the conductors thereat to provide free ends at the other end of the assembly, means associated with said feeding means for clamping and unclamping the conductors to and from the conductor feeding means at predetermined intervals during its operation, a connecting link being braided between successive assemblies, and means for causing the operation of the aforementioned means in timed relation to each other.

8. In an apparatus for assembling conductors, a braider, means for feeding a plurality of conductors to an assembling position with the forward ends of the conductors in predetermined end relation above the braiding head for having a braided covering applied to the so positioned conductors for a predetermined length thereof below the forward ends, means for causing the operation of the aforementioned means in timed relation to each other, means for advancing the operation thereof to operate the apparatus to a predetermined point in its cycle of operation at a greater speed than its normal operating speed, and adjustable means for controlling the operation of the braider for varying the length of the covered portion of the assembly.

9. In an apparatus for assembling strands, cover applying means, means for feeding a plurality of strands to an assembling position in predetermined end relation above the covering applying point for having a covering applied around an intermediate portion of the so positioned strands, means positioned above the covering applying point for severing the strands at predetermined distances from each end of the covering when in their elevated positions, and means for causing the operation of the aforementioned means in timed relation to each other.

10. In an apparatus for assembling strands, a braider, reciprocal means for feeding a plurality of strands to an assembling position in predetermined end relation above the braiding shed for having a covering braided around an intermediate portion of the so positioned strands, means for positively elevating and restoring the feeding means to a normal position below the braiding point, means for causing a severance of the strands at predetermined distances from each end of the covering while in their elevated positions, and means for causing the operation of the aforementioned means in timed relation to each other.

11. In an apparatus for assembling strands, a plurality of reciprocal elements for elevating a plurality of strands to an assembling position in predetermined end relation, means for applying a covering on the so positioned strands intermediate their ends, the elements during their reciprocation moving from a normal position below the covering applying point to a predetermined point thereabove, and means for causing the operation of the aforementioned means in timed relation to each other.

12. In an apparatus for assembling strands, a plurality of reciprocal hollow elements for elevating a plurality of strands carried therein to an assembling position in predetermined end relation, means for applying a covering around an intermediate portion of the so positioned strands, means for severing the strands a predetermined distance from each end of the covering, said severing means positioned above the covering applying point, the elements during their reciprocation moving from a normal position below the covering applying point to a predetermined point thereabove, and means for causing the operation of the aforementioned means in timed relation to each other.

13. In an apparatus for assembling strands, means for positively drawing the strands from continuous lengths thereof and positioning them in an elevated position, means for applying a covering to the strands upon the withdrawal of said first recited means, means for again operating said strand drawing and positioning means to elevate the strands, and means for severing the strands while so positioned.

14. In an apparatus for assembling strands, hollow members through which the strands are drawn, means for positively elevating said members to draw the strands from continuous lengths thereof and position them in an elevated position, means for applying a covering to the strands upon the withdrawal of said members, means for operating said members to elevate the strands, and means for severing the strands while so positioned.

In witness whereof, we hereunto subscribe our names this 22nd day of January, A. D. 1926.

GEORGE ALFRED BOUVIER.
JOHN WILLIAM RICHTER.